US012514815B2

(12) United States Patent
Geffen et al.

(10) Patent No.: US 12,514,815 B2
(45) Date of Patent: Jan. 6, 2026

(54) COSMETIC COMPOSITIONS WITH PROTEIN CONCENTRATE FROM CONDITIONED MEDIUM OF ADIPOSE-DERIVED STEM CELLS

(71) Applicant: STEM CELL MEDICINE LTD., Jerusalem (IL)

(72) Inventors: Yona Geffen, Moshav Nir Banim (IL); Ehud Marom, Tel Aviv (IL)

(73) Assignee: STEM CELL MEDICINE LTD., Jerusalem (IL)

( * ) Notice: Subject to any disclaimer, the term of this patent is extended or adjusted under 35 U.S.C. 154(b) by 689 days.

(21) Appl. No.: 17/793,749

(22) PCT Filed: Jan. 19, 2021

(86) PCT No.: PCT/IL2021/050057
§ 371 (c)(1),
(2) Date: Jul. 19, 2022

(87) PCT Pub. No.: WO2021/149047
PCT Pub. Date: Jul. 29, 2021

(65) Prior Publication Data
US 2023/0018711 A1 Jan. 19, 2023

(30) Foreign Application Priority Data
Jan. 20, 2020 (IL) .......................................... 272145

(51) Int. Cl.
| | |
|---|---|
| *A61K 35/35* | (2015.01) |
| *A61K 8/02* | (2006.01) |
| *A61K 8/98* | (2006.01) |
| *A61M 5/19* | (2006.01) |
| *A61Q 19/08* | (2006.01) |
| *C12N 5/0775* | (2010.01) |

(52) U.S. Cl.
CPC ............ *A61K 8/981* (2013.01); *A61K 8/0241* (2013.01); *A61M 5/19* (2013.01); *A61Q 19/08* (2013.01); *C12N 5/0667* (2013.01); *C12N 2500/32* (2013.01); *C12N 2500/90* (2013.01)

(58) Field of Classification Search
None
See application file for complete search history.

(56) References Cited

U.S. PATENT DOCUMENTS

| | | |
|---|---|---|
| 7,160,726 B2 | 1/2007 | Mansbridge |
| 8,101,167 B2 | 1/2012 | Gueniche |
| 8,361,485 B2 | 1/2013 | Naughton |
| 8,586,540 B2 | 11/2013 | You |
| 9,109,045 B2 | 8/2015 | Park |
| 9,168,214 B2 | 10/2015 | Brem |
| 2014/0205563 A1 | 7/2014 | Maguire |
| 2016/0000699 A1 | 1/2016 | Yang |
| 2018/0161373 A1 | 6/2018 | Lunyak |
| 2018/0318354 A1 | 11/2018 | De La Rosa et al. |

FOREIGN PATENT DOCUMENTS

| | | |
|---|---|---|
| AU | 2013202948 A1 | 5/2013 |
| CN | 101146532 A | 3/2008 |
| CN | 101351190 A | 1/2009 |
| CN | 102712899 A | 10/2012 |
| CN | 106540334 A | 3/2017 |
| CN | 106701672 A | 5/2017 |
| CN | 107206165 A | 9/2017 |
| CN | 107771093 A | 3/2018 |
| CN | 108289937 A | 7/2018 |
| CN | 109182264 A | 1/2019 |
| CN | 109219658 A | 1/2019 |
| CN | 110475534 A | 11/2019 |
| CN | 110520137 A | 11/2019 |
| CN | 110573170 A | 12/2019 |
| CN | 111388404 A | 7/2020 |
| CN | 112695013 A | 4/2021 |
| CN | 114727957 A | 7/2022 |
| CN | 115478048 A | 12/2022 |
| CN | 116249539 A | 6/2023 |
| EP | 2257272 B1 | 9/2013 |
| GB | 1076420 A | 7/1967 |
| JP | 2006271938 A | 10/2006 |
| JP | 2017534629 A | 11/2017 |
| JP | 2020534247 A | 11/2020 |
| JP | 2021523923 A | 9/2021 |
| KR | 20110119062 A | 11/2011 |
| KR | 20170020244 A | 2/2017 |

(Continued)

OTHER PUBLICATIONS

Yano et al. (2022) Regenerative Therapy 72-77. (Year: 2022).*
Inspection Technology for Pharmaceutical Excipients and Pharmaceutical Packaging Materials. Organized and Compiled by China Food and Drug Administration, Beijing: China Pharmaceutical Science and Technology Press. Nov. 20, 2019 (Nov. 30, 2019). pp. 111-112. With machine translation.
Pharmaceutics 3rd Edition. Liu Sulan et al., editors. Xi'an Jiaotong University Press. Nov. 30, 2020 (Nov. 30, 2020). pp. 266-269. With machine translation.
Moon et al., (2012) The effect of secretory factors of adipose-derived stem cells on human keratinocytes. Int J Mol Sci 13(1): 1239-1257.
Seetharaman et al., (2019) Mesenchymal Stem Cell Conditioned Media Ameliorate Psoriasis Vulgaris: A Case Study. Case Rep Dermatol Med 2019: 8309103; 5 pages.

(Continued)

*Primary Examiner* — Russell G Fiebig
(74) *Attorney, Agent, or Firm* — Rothwell, Figg, Ernst & Manbeck, P.C.

(57) ABSTRACT

Anti-aging cosmetic compositions prepared from conditioned medium of adipose-derived stem cells are provided. The cosmetic compositions are preferably ready-to-mix compositions, comprising two separate components: a protein component in a dried form that serves as the cosmetically active ingredient of the product, comprising a protein fraction purified from an adipose-derived stem cell conditioned medium; and a reconstitution component, for reconstituting the lyophilized protein component just before application to the skin.

10 Claims, 24 Drawing Sheets

(56) References Cited

FOREIGN PATENT DOCUMENTS

| | | | |
|---|---|---|---|
| KR | 101753630 B1 | 7/2017 | |
| KR | 101806115 B1 | 12/2017 | |
| KR | 20190003383 A | 1/2019 | |
| TW | 226245 B | 1/2005 | |
| TW | 202400030 A | 1/2024 | |
| WO | 9927983 A1 | 6/1999 | |
| WO | 2013118877 A1 | 8/2013 | |
| WO | 2016109947 A1 | 7/2016 | |
| WO | 2017139795 A1 | 8/2017 | |
| WO | 2018045022 A1 | 3/2018 | |
| WO | 2018078524 A1 | 5/2018 | |
| WO | 2018150440 A1 | 8/2018 | |
| WO | 2018211498 A1 | 11/2018 | |
| WO | 2019004738 A2 | 1/2019 | |
| WO | 2019124522 A1 | 6/2019 | |
| WO | WO-2019112238 A2 * | 6/2019 | ............... A61K 8/14 |
| WO | 2022231295 A1 | 11/2022 | |

OTHER PUBLICATIONS

Amirthalingam and Seetharam (2016) Stem Cell Derived Cosmetic Products: An overview. Manipal Journal of Medical Sciences 1(2): 46-52.

Bunnell et al., (2008) Adipose-derived stem cells: isolation, expansion and differentiation. Methods 45(2): 115-120.

Fukuoka and Suga (2015) Hair Regeneration Treatment Using Adipose-Derived Stem Cell Conditioned Medium: Follow-up With Trichograms. Eplasty 15: 65-72.

Fukuoka et al., (2012) The latest advance in hair regeneration therapy using proteins secreted by adipose-derived stem cells. The American Journal of Cosmetic Surgery 29(4): 273-282.

Fukuoka et al., (2017) Hair Regeneration Therapy: Application of Adipose-Derived Stem Cells. Curr Stem Cell Res Ther 12(7): 531-534.

Lee et al., (2009) Hypoxia-enhanced wound-healing function of adipose-derived stem cells: increase in stem cell proliferation and up-regulation of VEGF and bFGF. Wound Repair Regen 17(4): 540-547.

Park et al., (2010) Hair growth stimulated by conditioned medium of adipose-derived stem cells is enhanced by hypoxia: evidence of increased growth factor secretion. Biomed Res 31(1): 27-34.

ADIOStem Product Protocol. CELPROGEN Inc., retrieved from: <<https://celprogen.com/content/uploads/product/1/14577328745.pdf>>, on Jul. 24, 2019. 1 page.

Human Adipose Derived Stem Cell Condition Media—1L. CELPROGEN Inc., retrieved from: <<https://celprogen.com/content/uploads/product/1/14999698142.pdf>>, on Jul. 24, 2019. 2 pages.

Blázquez et al., (2018) Murine embryos exposed to human endometrial MSCs-derived extracellular vesicles exhibit higher VEGF/PDGF AA release, increased blastomere count and hatching rates. PLoS One 13(4): e0196080, 18 pages.

Chouaib et al., (2023) Towards the Standardization of Mesenchymal Stem Cell Secretome-Derived Product Manufacturing for Tissue Regeneration. Int J Mol Sci 24(16): 12594, 15 pages.

Design and application of drug freeze-dried preparation technology. Compiled by Yao Jing and Zhang Ziqiang. China Medical Science and Technology Press. Jun. 30, 2007. pp. 250-255. With machine translation, 17 pages.

Modern hair transplantation technology. Editor-in-Chief: Zhang Jufang, Zhejiang Science and Technology Press. May 31, 2018. pp. 310-318. With machine translation, 20 pages.

Liu Baochi et al., (editors) Clinical Study on Cell Therapy. Fudan University Press. Nov. 30, 2019, pp. 341-342. With machine translation (8 pages).

Tang Yan et al., (2019) Clinical application of adipose stem cells use research. Chinese Journal of Cell Biology, S1: 2156-2165. Machine translated abstract. 3 pages.

Yang Tong Editor-in-Chief, Cosmetic Pharmacy. China Medical Science and Technology Press. Aug. 31, 2000, pp. 339-342. With machine translation (13 pages).

Izutsu Kenichi; "Freeze-Drying of Protein Pharmaceuticals"; Pharmaceutical Sciences; 72(6); 2012; pp. 353-358 with machine translation. (12 pages).

* cited by examiner

|      | F1 | F2  | F3  | F4 | F5 | F6 | F7  | F8 | F9 | F10 | F11 | F12 | F13 | F14 | F15  | F16  | F17  |
| ---- | -- | --- | --- | -- | -- | -- | --- | -- | -- | --- | --- | --- | --- | --- | ---- | ---- | ---- |
| Man  | 5% | 10% | 20% | -  | -  | -  | -   | 3% | 2% | 2%  | -   | -   | -   | -   | 3%   | -    | -    |
| BSA  | -  | -   | -   | 2% | 5% | -  | -   | -  | 1% | -   | 1%  | 1%  | -   | 1%  | -    | 2%   | -    |
| His  | -  | -   | -   | -  | -  | 5% | 10% | -  | -  | 2%  | -   | 1%  | 3%  | 3%  | -    | -    | 3%   |
| EDTA | -  | -   | -   | -  | -  | -  | -   | -  | -  | -   | -   | -   | -   | -   | 0.1% | 0.1% | 0.1% |
| NaCl | -  | -   | -   | -  | -  | -  | -   | -  | -  | -   | -   | -   | -   | -   | 0.5% | 0.8% | 0.5% |

Man = mannitol; His = histidine

Figure 1

| Formula | Material | %W/V | Total initial weight (gr) | Initial weight per vial (gr) | Post lyophilization weight per vial (gr) | Post lyophilization texture | Reconstit. time (Sec) | Successful reconstit. (Y/N) |
|---|---|---|---|---|---|---|---|---|
| F3 | Mannitol | 20% | 4.007 | 1.002 | 1.005 | United bulk form | >>>90 | N |
| F2 | | 10% | 1.998 | 0.499 | 0.546 | | >90 | N |
| F1 | | 5% | 1.003 | 0.25 | 0.33 | | <20 | Y |
| F7 | Histidine | 10% | 2.002 | 0.500 | 0.606 | Sponge form | >90 | N |
| F6 | | 5% | 1.00 | 0.25 | 0.342 | | <90 | Y |
| F5 | BSA | 5% | 1.002 | 0.25 | 0.258 | Cake-like form | <90 | Y |
| F4 | | 2% | 0.402 | 0.1 | 0.094 | | <60 | Y |

Figure 2

| Formula | Reconstitution time (Sec) | | | | Successful reconstit. (Y/N) | Water content (%) | | | |
|---|---|---|---|---|---|---|---|---|---|
| | Repeat 1 | Repeat 2 | Av | STD | | Repeat 1 | Repeat 2 | Av | STD |
| | Success criteria <20 | | | | | Success criteria <5 | | | |
| F8 | - | 15 | 15 | - | Y | 1.3 | 1.3 | 1.3 | 0 |
| F9 | 16 | 12 | 14 | 2.8 | Y | 3.4 | 3.4 | 3.4 | 0 |
| F10 | 57 | 60 | 58.5 | 2.1 | N | N/A | | | |
| F11 | 20 | 28 | 24 | 5.6 | N | 5.9 | 6.7 | 6.3 | 0.56 |
| F12 | 27 | 32 | 29.5 | 3.5 | N | 4.8 | 6.1 | 5.45 | 0.91 |
| F13 | 90 | 90 | 90 | 0 | N | 1.4 | 2.1 | 1.75 | 0.49 |
| F14 | 39 | 90 | 64.5 | 36 | N | 4.2 | 4.2 | 4.2 | 0 |
| F15 | 17 | 12 | 14.5 | 3.5 | Y | 1.3 | 1.3 | 1.3 | 0 |
| F16 | 13 | 11 | 12 | 1.4 | Y | 5.4 | 4.9 | 5.15 | 0.35 |
| F17 | 90 | 90 | 90 | 0 | N | 1.9 | 2.1 | 2 | 0.14 |

Figure 3

| Formula | F19 | F20 | F21 | F22 | F23 | F24 | F25 | F26 | F27 | F28 |
|---|---|---|---|---|---|---|---|---|---|---|
| BSA | - | - | - | - | - | - | - | - | - | - |
| Ascorbic acid | - | 1ml | - | - | - | - | 0.2ml | 0.2ml | - | - |
| EDTA | 1ml | 1ml | - | - | - | 1ml | 0.2ml | 0.2ml | 1ml | |
| NaCl | 1ml | 1ml | 1ml | 1ml | 1ml | 1ml | 1ml | - | 1ml | 1ml |
| Citric acid | - | - | 1ml | - | - | 1ml | - | - | - | - |
| NaH$_2$PO$_4 \cdot$ H$_2$O | - | - | - | 1ml | - | - | 1ml | - | - | - |
| tri-Sodium citrate | - | - | - | - | 1ml | - | - | 1ml | - | 1ml |
| Polysorbate 80 | - | - | - | - | - | - | - | - | 1ml | 1ml |
| Complete to 13 ml with 3% (w/v) mannitol | | | | | | | | | | |

Figure 5

Lyophilized protein composition, 25°C /60%RH

| Test | | Time 0 Results | 3M Results | 6M Results |
|---|---|---|---|---|
| Appearance | | White to off-white powder. Cake like appearance, placed at the bottom of the vial. Absence of foreign particles. | White to off-white powder. Cake like appearance, placed at the bottom of the vial. Absence of foreign particles. | White to off-white powder. Cake like appearance, placed at the bottom of the vial. Absence of foreign particles. |
| pH | | 7.6 | 7.34 | 7.33 |
| Protein content (per vial) | | 30μg | 26μg | 29μg |
| Microbial tests | Enterobacteriaceae | Absent/1gr | NA | NA |
| | Staphylococcus aureus | Absent/1gr | NA | NA |
| | Pseudomonas aeruginosa | Absent/1gr | NA | NA |
| | Total microbial count | <10 CFU/1gr | NA | NA |
| | Yeast/Mold | <10 CFU/1gr | NA | NA |

Figure 9A

Lyophilized protein composition, 40°C /75%RH

| Test | | Time 0 Results | 3M Results | 6M Results |
|---|---|---|---|---|
| Appearance | | White to off-white powder. Cake like appearance, placed at the bottom of the vial. Absence of foreign particles. | White to off-white powder. Cake like appearance, placed at the bottom of the vial. Absence of foreign particles. | White to off-white powder. Cake like appearance, placed at the bottom of the vial. Absence of foreign particles. |
| pH | | 7.6 | 7.376 | 7.291 |
| Protein content (per vial) | | 30μg | 23μg | 31μg |
| Microbial tests | *Enterobacteriaceae* | Absent/1gr | Absent/1gr | Absent/1gr |
| | *Staphylococcus aureus* | Absent/1gr | Absent/1gr | Absent/1gr |
| | *Pseudomonas aeruginosa* | Absent/1gr | Absent/1gr | Absent/1gr |
| | *Total microbial count* | <10 CFU/1gr | <10 CFU/1gr | <10 CFU/1gr |
| | *Yeast/Mold* | <10 CFU/1gr | <10 CFU/1gr | <10 CFU/1gr |

Figure 9B

Reconstitution composition, 25°C /60%RH

| Test | | Time 0 Results | 3M Results | 6M Results |
|---|---|---|---|---|
| Appearance | | White to off-white, viscous liquid lotion. Absence of foreign particles. | White to off-white, viscous liquid lotion. Absence of foreign particles. | White to off-white, viscous liquid lotion. Absence of foreign particles. |
| pH | | 7.58 | 7.13 | 7.05 |
| Total content (total weight) | | 13.79 gr | 13.82 gr | 13.81 |
| Microbial tests | Enterobacteriaecae | Absent/1gr | NA | NA |
| | Staphylococcus aureus | Absent/1gr | NA | NA |
| | Pseudomonas aeruginosa | Absent/1gr | NA | NA |
| | Total microbial count | <10 CFU/1gr | NA | NA |
| | Yeast/Mold | <10 CFU/1gr | NA | NA |

Figure 9C

Reconstitution composition, 40°C /75%RH

| Test | | Time 0 Results | 3M Results | 6M Results |
|---|---|---|---|---|
| Appearance | | White to off-white, viscous liquid lotion. Absence of foreign particles. | White to off-white, viscous liquid lotion. Absence of foreign particles. | White to off-white, viscous liquid lotion. Absence of foreign particles. |
| pH | | 7.58 | 7.3 | 7.358 |
| Total content (total weight) | | 13.786 gr | 13.83 gr | 13.83 gr |
| Microbial tests | *Enterobacteriaceae* | Absent/1gr | Absent/1gr | Absent/1gr |
| | *Staphylococcus aureus* | Absent/1gr | Absent/1gr | Absent/1gr |
| | *Pseudomonas aeruginosa* | Absent/1gr | Absent/1gr | Absent/1gr |
| | Total microbial count | <10 CFU/1gr | <10 CFU/1gr | <10 CFU/1gr |
| | Yeast/Mold | <10 CFU/1gr | <10 CFU/1gr | <10 CFU/1gr |

Figure 9D

| | Question 1<br>My overall experience with using the lotion product was positive. | | Question 2<br>The lotion had a pleasant, smoothing texture on the skin. | | Question 3<br>The lotion was easy to apply. | | Question 4<br>The color of the lotion is appealing to me. | |
|---|---|---|---|---|---|---|---|---|
| Successes | 25 | 71.4% | 26 | 74.3% | 26 | 74.3% | 25 | 71.4% |
| Failures | 10 | 28.6% | 9 | 25.7% | 9 | 25.7% | 10 | 28.6% |
| Total Trials | 35 | | 35 | | 35 | | 35 | |
| P Value | < 0.001 | | < 0.001 | | < 0.001 | | < 0.001 | |
| Significance | YES | | YES | | YES | | YES | |

| | Question 5<br>My skin appeared more even-toned after using the lotion. | | Question 6<br>Using the lotion improved my skin texture. | | Question 7<br>Using the lotion periodically gave my skin a younger look. | | Question 8<br>Using the lotion contributes to the looks of wrinkle reduction. | |
|---|---|---|---|---|---|---|---|---|
| Successes | 23 | 65.7% | 26 | 74.3% | 25 | 71.4% | 24 | 68.6% |
| Failures | 12 | 34.3% | 9 | 25.7% | 10 | 28.6% | 11 | 31.4% |
| Total Trials | 35 | | 35 | | 35 | | 35 | |
| P Value | 0.009 | | < 0.001 | | < 0.001 | | 0.002 | |
| Significance | YES | | YES | | YES | | YES | |

| | Question 9<br>When I use the lotion, it stimulates my skin, and gives fresh revitalized looks. | | Question 10<br>When I use the lotion, it feels it reduces the appearance of aging. | | Question 11<br>Using the lotion encouraged my skin appearance to be toned. | | Question 12<br>Using the lotion provide my skin a rejuvenate looks. | |
|---|---|---|---|---|---|---|---|---|
| Successes | 24 | 68.6% | 24 | 68.6% | 25 | 71.4% | 25 | 71.4% |
| Failures | 11 | 31.4% | 11 | 31.4% | 10 | 28.6% | 10 | 28.6% |
| Total Trials | 35 | | 35 | | 35 | | 35 | |
| P Value | 0.002 | | 0.002 | | < 0.001 | | < 0.001 | |
| Significance | YES | | YES | | YES | | YES | |

Figure 10A

|  | Question 13 |
| --- | --- |
|  | I would recommend this product to a friend. |
| Successes | 24 | 68.6% |
| Failures | 11 | 31.4% |
| Total Trials | 35 |
| P Value | 0.002 |
| Significance | YES |

Figure 10B

COSMETIC COMPOSITIONS WITH PROTEIN CONCENTRATE FROM CONDITIONED MEDIUM OF ADIPOSE-DERIVED STEM CELLS

CROSS-REFERENCE TO RELATED APPLICATIONS

The present application is a National Stage filing under 35 U.S.C. § 371 of PCT/IL2021/050057, filed on Jan. 19, 2021, and claims the benefit of Israel Patent Application No. 272145, filed on Jan. 20, 2020. Each application is incorporated herein by references in their entirety.

FIELD OF THE INVENTION

The present invention relates to anti-aging cosmetic products prepared from conditioned medium of adipose-derived stem cells, which are particularly effective and also characterized by a long shelf-life and long-term stability. The anti-aging cosmetic products of the present invention are based on a protein concentrate purified from the conditioned medium and formulated with cosmetic excipients. The cosmetic products of the present invention may be provided as two-component cosmetic compositions, comprising the protein composition derived from the conditioned medium in a dried form, and a reconstitution medium for reconstitution prior to use.

BACKGROUND OF THE INVENTION

Skin aging is characterized by features such as age spots, fine lines and wrinkles, reduced volume and elasticity, and changes to the texture of the skin.

Various over-the-counter anti-aging cosmetic products are available for improving parameters such as skin tone, skin appearance and the like, and maintaining a more healthy and younger looking skin. These generally contain fatty acids and alcohols, various vitamins and vitamin derivatives, fillers such as collagen and hyaluronic acid, and plant extracts. As the cosmetic industry advances, new cosmetic ingredients are developed.

Anti-aging cosmetic compositions based on stem cell conditioned media have been developed, including serums, creams, lotions, toners and cleansers. Such products are reviewed, for example, in Amirthalingam and Seetharam (2016) *MJMS.*, 1(2):46-52. Additional exemplary products include ADIOStem™ (Celprogen Inc.), which is a moisturizing cream containing adipose derived stem cell conditioned media, purified water and glycerin (Product Protocol, www.celprogen.com).

EP 2257272 discloses a method for the cosmetic prevention or treatment of skin aging in an individual, comprising administering to said individual a cosmetically active quantity of a gingival fibroblast-derived product such as gingival fibroblast whole cells, a gingival fibroblast culture and a gingival fibroblast conditioned medium.

U.S. Pat. No. 7,160,726 discloses compositions comprising cell culture medium conditioned by cells grown in three-dimensional culture, particularly dermal fibroblasts, keratinocytes, epithelial cells, chondrocytes, smooth muscle cells and myocytes. The conditioned cell medium may be used for at least one of cosmetic applications, cosmeceutical applications and pharmaceutical applications, among other things.

U.S. Pat. No. 8,101,167 discloses the use of at least one conditioned cell culture medium or of an extract thereof, for the preparation of a composition for use in the treatment of the signs of inflammation and/or of immune disorders, and such use thereof, said medium being able to be obtained by contact with at least one culture of digestive tract cells and at least one probiotic microorganism.

U.S. Pat. No. 8,361,485 discloses conditioned cell culture medium compositions and methods of use. The medium may be conditioned by stromal cells, parenchymal cells, mesenchymal stem cells, liver reserve cells, neural stem cells, pancreatic stem cells and/or embryonic stem cells. The cells may be genetically modified. A three-dimensional tissue construct is preferred. Physical embodiments of the conditioned medium include liquid or solid, frozen, lyophilized or dried into a powder. The medium is formulated with a pharmaceutically acceptable carrier as a vehicle for internal administration, applied directly to a food item or product, formulated with a salve or ointment for topical applications, or, for example, made into or added to surgical glue to accelerate healing of sutures following invasive procedures. The medium may be further processed to concentrate or reduce one or more factors or components contained within the medium.

U.S. Pat. No. 8,586,540 discloses a culture medium for fetus-derived mesenchymal stem cells in amniotic fluid. Further discloses is a composition for improving skin conditions comprising the culture medium of fetus-derived mesenchymal stem cells in amniotic fluid as an active ingredient, in which the skin conditions to be improved include whitening, wrinkles, skin damages caused by UV rays or skin lifting.

U.S. Pat. No. 9,109,045 discloses a method capable of synthesizing human growth factors in significantly large amounts by culturing adipose-derived stem cells extracted from human adipose cells in suitable media and conditions. Also, stem cell culture media produced according to the method of the invention, and human growth factors isolated from the culture media, can be advantageously used as raw materials for drugs and cosmetics.

WO 2018/211498, assigned to the Applicant of the present invention, discloses, inter alia, methods for obtaining adipose-derived stem cells (ADSCs), which are more cost effective and which provide higher yields compared to currently used methods.

Most cosmetic products, particularly cosmetic products based on naturally-occurring ingredients, have limited shelf-lives and stability, and typically, once opened, can only last for up to 12 months at room-temperature, and in many cases up to only 6 months.

There is a need for cosmetic compositions which are effective and useful for skin rejuvenation, improving skin appearance, skin tone and the like, and also characterized by a long shelf-life and improved stability under a variety of storage conditions.

SUMMARY OF THE INVENTION

The present invention provides anti-aging cosmetic compositions prepared from conditioned medium of adipose-derived stem cells. The cosmetic compositions of the present invention are based on a protein concentrate purified from the conditioned medium and formulated with cosmetic excipients. In some embodiments, the cosmetic compositions of the present invention are provided as ready-to-mix compositions, comprising two separate components: a protein component in a dried (e.g. lyophilized) form that serves as the cosmetically active ingredient of the product, comprising a protein fraction purified from an adipose-derived stem cell conditioned medium, and a reconstitution component, for reconstituting the dried protein component just before application to the skin. The two components are kept separate during production, shipping and storage, and mixed directly before use. The present invention overcomes problems of instability and limited shelf-life of cosmetic compositions by providing a product composed of two separate components that are stable and mixed to form a composition for topical application just before use.

Advantageously, maintaining the dried protein composition separate from the reconstitution medium as two separate components provides a remarkable stability even under conditions of elevated humidity and/or temperatures, while maintaining the potency of the active protein fraction. As exemplified hereinbelow, stability assays showed that both the dried protein composition and the reconstitution composition are stable when stored at 40° C./75% RH for at least 6 months, which is equivalent to at least 1.5 years of shelf-life under standard storage conditions at room temperature.

The protein fraction according to some embodiments of the present invention is purified from a cell culture medium conditioned by adipose-derived stem cells that were grown in a serum-containing medium and subsequently in a serum-free medium for at least 48 hours prior to collection of the medium. The protein fraction is obtained by concentrating the conditioned medium and removing components smaller than 1 kDa. In some embodiments, the protein fraction is obtained by removing components smaller than 3 kDa. Preferably, the protein fraction is formulated with cosmetic excipients and being substantially devoid of components of the cell culture medium.

In some exemplary embodiments, the protein fraction is obtained by concentrating and filtering the conditioned medium using Tangential Flow Filtration (TFF) with an appropriate molecular weight cutoff (e.g., 1 kDa or 3 kDa), to obtain the protein fraction as a retentate. In some embodiments, the obtained protein fraction is diafiltrated against an aqueous formulation comprising cosmetically acceptable excipients, to obtain the protein fraction purified from cell culture medium components and formulated with the cosmetic excipients.

The protein fraction formulated with cosmetic excipients is substantially devoid of components of the cell culture medium, such as various metals, as exemplified herein below. Advantageously, the formulated protein fraction is also substantially devoid of any antibiotics that were used during growth of the stem cells. This is in contrast to previously described cosmetic products based on conditioned media, in which a conditioned medium is collected and formulated with various excipients without any purification or separation of medium components A protein fraction according to the present invention was found effective in increasing viability and inducing proliferation of human keratinocytes in vitro, as exemplified hereinbelow. When used by human subjects, a reconstituted cosmetic composition obtained following mixing of a dried protein component according to the present invention and a reconstitution medium was found to be safe and non-irritating, and furthermore, showed a smoother skin and reduction in the depth of wrinkles already after 6 weeks of use. The reduction in the depth of wrinkles was also observed after 12 weeks of use. In addition, softening of the skin was observed after 6 weeks of use, which continued after 12 weeks of use.

The present invention therefore provides cosmetic compositions particularly effective and useful for skin rejuvenation, improving skin appearance, skin tone and the like, also characterized by improved stability and prolonged shelf-live.

According to one aspect, the present invention provides a cosmetic composition in a powder form comprising a dried protein fraction purified from a human adipose-derived stem cell conditioned medium and at least one cosmetically acceptable excipient, wherein the protein fraction comprises proteins and particles that remained after removal of components smaller than 1 kDa.

In some embodiments, the protein fraction comprises proteins and particles that remained after removal of components smaller than 3 kDa.

In some embodiments, the cosmetic composition comprises at least $10^9$ exosomes per mg protein.

In some embodiments, the protein fraction is substantially devoid of components of the cell culture medium in which the human adipose-derived stem cells were grown.

In some embodiments, the human adipose-derived stem cells were grown in a serum-containing medium for at least 24 hours and subsequently in a serum-free medium for at least 48 hours prior to collection of the medium.

In some embodiments, the dried protein fraction is a lyophilized protein fraction.

In some embodiments, the protein content of the composition is at least 0.2 μg/mg powder.

In some embodiments, the composition contains less than 5% wt residual water.

In some embodiments, the cosmetic composition is obtained by a process comprising the following steps: (a) obtaining human adipose-derived stem cells (hADSCs); (b) culturing the hADSCs in a serum-containing medium for at least 24 hours; (c) sub-culturing the hADSCs in a serum-free medium for at least 48 hours to obtain a conditioned medium; (d) separating the hADSCs and cell debris and collecting the conditioned medium; (e) concentrating and filtering the conditioned medium using Tangential Flow Filtration (TFF) to remove components smaller than 1 kDa and obtain the protein fraction as a retentate; (f) diafiltrating the protein fraction using an aqueous formulation comprising at least one cosmetically acceptable bulking agent and optionally at least one additional cosmetically acceptable excipient, to obtain the protein fraction purified from cell culture medium components and formulated with the aqueous formulation; and (g) drying the obtained protein fraction.

In some embodiments, the cosmetic composition is obtained by a process comprising the following steps: (a) obtaining human adipose-derived stem cells (hADSCs); (b) culturing the hADSCs in a serum-containing medium for at least 24 hours; (c) sub-culturing the hADSCs in a serum-free medium for at least 48 hours to obtain a conditioned medium; (d) separating the hADSCs and cell debris and collecting the conditioned medium; (e) concentrating and filtering the conditioned medium using Tangential Flow Filtration (TFF) to remove components smaller than 3 kDa and obtain the protein fraction as a retentate; (f) diafiltrating the protein fraction using an aqueous formulation comprising at least one cosmetically acceptable bulking agent and optionally at least one additional cosmetically acceptable excipient, to obtain the protein fraction purified from cell culture medium components and formulated with the aqueous formulation; and (g) drying the obtained protein fraction.

In some embodiments, the aqueous formulation comprises between 2%-10% (w/v) of the at least one bulking agent. In some embodiments, the bulking agent comprises mannitol. In some embodiments, the aqueous formulation further comprises at least one stabilizer and at least one tonicity agent. In some embodiments, the aqueous formulation comprises between 0.01-1% (w/v) of the at least one stabilizer. In some embodiments, the at least one stabilizer comprises EDTA. In some embodiments, the aqueous formulation comprises between 0.1-1% (w/v) of the at least one tonicity agent. In some embodiments, the at least one tonicity agent comprises sodium chloride.

In some embodiments, the medium is conditioned by human adipose-derived stem cells obtained by a process comprising the following steps: (a) freezing a lipoaspirate; (b) thawing the lipoaspirate and dissociating with a tissue-dissociation enzyme or by mechanical disruption; (c) pelleting a cellular fraction comprising the ADSCs by centrifugation, and optionally washing the pellet with a suspension medium capable of supporting cell viability and subjecting the suspension to at least one additional centrifugation; (d) resuspending the pellet obtained in step (c) in a suspension medium capable of supporting cell viability and selecting ADSCs from the population of cells in the resuspended pellet; (e) optionally conducting at least one filtration prior to the ADSC selection; and (f) optionally culturing the ADSCs for at least 3 passages.

In some embodiments, the medium is conditioned by a population of human adipose-derived stem cells characterized by positive expression of CD73, CD90 and CD105 by at least 90% of the cells, and positive expression of CD45 by less than 5% of the cells.

According to another aspect, the present invention provides a method for improving at least one skin condition associated with aging, the method comprising providing the cosmetic composition as disclosed herein; reconstituting the composition to obtain a composition suitable for application to the skin; and applying to the skin.

According to a further aspect, the present invention provides a two-component cosmetic product comprising, as separate compositions ready for mixing:
(a) a dried protein composition in a powder form comprising a protein fraction purified from a human adipose-derived stem cell conditioned medium and at least one cosmetically acceptable excipient, wherein the protein fraction comprises proteins and particles that remained after removal of components smaller than 1 kDa; and
(b) an aqueous reconstitution composition comprising water and at least one cosmetically acceptable excipient, for reconstituting the lyophilized protein composition to form a composition suitable for topical application to the skin of a subject,
wherein the two components are maintained separately and mixed prior to use.

In some embodiments, the protein fraction comprises proteins and particles that remained after removal of components smaller than 3 kDa.

In some embodiments, the dried protein composition comprises at least $10^9$ exosomes per mg protein.

In some embodiments, the protein fraction is substantially devoid of components of the cell culture medium in which the human adipose-derived stem cells were grown.

In some embodiments, the human adipose-derived stem cells were grown in a serum-containing medium for at least 24 hours and subsequently in a serum-free medium for at least 48 hours prior to collection of the medium.

In some embodiments, the protein content of the dried protein composition is at least 0.2 µg/mg powder.

In some embodiments, the dried protein composition contains less than 5% wt residual water.

In some embodiments, the dried protein composition is obtained by a process comprising the following steps: concentrating and filtering the conditioned medium using Tangential Flow Filtration (TFF) to remove components smaller than 1 kDa and obtain the protein fraction as a retentate; diafiltrating the protein fraction using an aqueous formulation comprising at least one cosmetically acceptable bulking agent and optionally at least one additional cosmetically acceptable excipient to obtain a protein fraction purified from cell culture medium components and formulated with the aqueous formulation; and drying the formulated protein fraction.

In some embodiments, the dried protein composition is obtained by a process comprising the following steps: concentrating and filtering the conditioned medium using Tangential Flow Filtration (TFF) to remove components smaller than 3 kDa and obtain the protein fraction as a retentate; diafiltrating the protein fraction using an aqueous formulation comprising at least one cosmetically acceptable bulking agent and optionally at least one additional cosmetically acceptable excipient to obtain a protein fraction purified from cell culture medium components and formulated with the aqueous formulation; and drying the formulated protein fraction.

In some embodiments, the aqueous formulation comprises between 2%-10% (w/v) of the at least one bulking agent. In some embodiments, the bulking agent comprises mannitol. In some embodiments, the aqueous formulation further comprises at least one stabilizer and at least one tonicity agent. In some embodiments, the aqueous formulation comprises between 0.01-1% (w/v) of the at least one stabilizer. In some embodiments, the at least one stabilizer comprises EDTA. In some embodiments, the aqueous formulation comprises between 0.1-1% (w/v) of the at least one tonicity agent. In some embodiments, the at least one tonicity agent comprises sodium chloride.

In some embodiments, the medium is conditioned by human adipose-derived stem cells obtained by a process comprising the following steps: (a) freezing a lipoaspirate; (b) thawing the lipoaspirate and dissociating with a tissue-dissociation enzyme or by mechanical disruption; (c) pelleting a cellular fraction comprising the ADSCs by centrifugation, and optionally washing the pellet with a suspension medium capable of supporting cell viability and subjecting the suspension to at least one additional centrifugation; (d) resuspending the pellet obtained in step (c) in a suspension medium capable of supporting cell viability and selecting ADSCs from the population of cells in the resuspended pellet; (e) optionally conducting at least one filtration prior to the ADSC selection; and (f) optionally culturing the ADSCs for at least 3 passages.

In some embodiments, the medium is conditioned by a population of human adipose-derived stem cells characterized by positive expression of CD73, CD90 and CD105 by at least 90% of the cells, and positive expression of CD45 by less than 5% of the cells.

In some embodiments, the dried protein composition is a lyophilized protein composition.

In some embodiments, the viscosity parameters of the reconstitution composition prior to mixing with the dried protein composition are as follows: 12 RPM: 1800-2700 cP; 18 RPM: 1400-2000 cP; 60 RPM: 700-1000 cP; 100 RPM: 500-800 cP, as measured using a Brookfield viscometer at room temperature.

In some embodiments, the aqueous reconstitution composition comprises distilled water and cosmetically acceptable excipients comprising at least one emulsifier and at least one emollient. In some embodiments, the aqueous reconstitution composition comprises between 2-10% (w/w) of the at least one emulsifier, for example between 2-5% (w/w) of the at least one emulsifier. Each possibility represents a separate embodiment of the present invention. In some embodiments, the aqueous reconstitution composition comprises between 2-10% (w/w) of the at least one emollient, for example between 2-5% (w/w) of the at least one emollient. Each possibility represents a separate embodiment of the present invention. In some embodiments, the aqueous reconstitution composition further comprises at least one additional cosmetically acceptable excipient selected from the group consisting of humectants, pH adjusting agents, thickening agents and preservatives.

In some embodiments, the weight ratio between the dried protein composition and the aqueous reconstitution composition is at least 1:20, for example at least 1:25, in the range of 1:20 to 1:100, in the range of 1:20-1:50. Each possibility represents a separate embodiment of the present invention. In some embodiments, the weight ratio between the dried protein composition and the aqueous reconstitution composition is in the range of 1:20 to 1:50.

In some embodiments, following mixing, the dried (e.g. lyophilized) protein composition is reconstituted within 30 seconds, for example within 20 seconds. Each possibility represents a separate embodiment of the present invention.

In some embodiments, the pH of the dried protein composition prior to mixing with the aqueous reconstitution composition is in the range of 7.0-7.6.

In some embodiments, the pH of the aqueous reconstitution composition prior to mixing with the dried protein composition is in the range of 7.0-7.6.

In some embodiments, the pH of the reconstituted composition following mixing of the two compositions is in the range of 7.0-7.6.

It will be understood that the final reconstituted composition obtained after mixing is preferably isotonic.

The reconstituted composition suitable for topical application is typically in a form selected from the group consisting of a lotion, cream and gel. Each possibility represents a separate embodiment. In a currently preferred embodiment, the reconstituted composition is a lotion.

The cosmetic compositions of the present invention are suitable for application to any skin part, including for example face, neck, arms and hands.

In some embodiments, the cosmetic product is provided as a prefilled syringe, wherein the syringe comprises: a first chamber comprising the aqueous reconstitution composition, a second chamber comprising the dried protein composition, and a plunger, wherein upon movement of the plunger the aqueous reconstitution composition is delivered from the first chamber into the second chamber and mixed with the dried protein composition for reconstitution.

According to a further aspect, the present invention provides a method for improving at least one skin condition associated with aging, the method comprising providing the two-component cosmetic product as disclosed herein; mixing the dried protein composition with the aqueous reconstitution composition to form a reconstituted composition suitable for application to the skin; and applying to the skin.

These and further aspects and features of the present invention will become apparent from the detailed description, examples and claims which follow.

BRIEF DESCRIPTION OF THE FIGURES

FIG. 1. Formulation of the protein fraction—selection of a bulking agent. Composition of F1-F17 formulations. Values represent % w/v.

FIG. 2. Bulking agent characterization. Material loss during lyophilization, post lyophilization texture and reconstitution time of compositions F1-F7.

FIG. 3. Bulking agent characterization. Residual water content following lyophilization and reconstitution time of compositions F8-F17.

FIG. 5. Exemplary aqueous formulations of the protein fraction. Values indicate the volume that is taken from respective stock solutions, as specified in the text.

FIG. 9. Stability assays. (A) long-term stability assay and (B) accelerated stability assay of a lyophilized protein composition according to the present invention. (C) long-term stability assay and (D) accelerated stability assay of a reconstitution composition according to the present invention.

FIG. 10. Consumer perception of a cosmetic product according to the present invention-questionnaire responses. (A) Questions 1-12; (B) Question 13.

DETAILED DESCRIPTION OF THE INVENTION

Figures 4A, 4B:
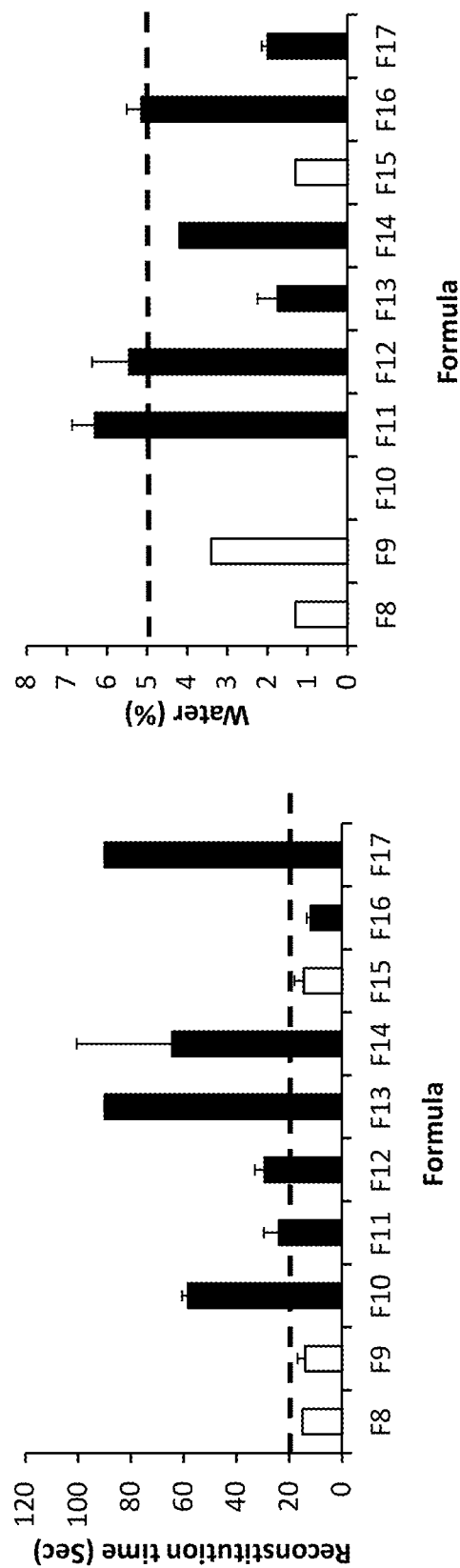
FIG. 4. Graphic representation of (A) reconstitution time; and (B) residual water content following lyophilization of compositions F8-F17.

The present invention provides anti-aging cosmetic products prepared from conditioned medium of adipose-derived stem cells, characterized by a long shelf-life and long-term stability. The present invention overcomes problems of instability and limited shelf-life of cosmetic compositions by providing, according to some embodiments, a product composed of two separate components that are stable and mixed to form a composition for topical application just before use.

More particularly, in some embodiments, the cosmetic compositions provided by the present invention are ready-to-mix compositions, comprising two separate components: a protein composition in a dried form (e.g. lyophilized) form that serves as the cosmetically active ingredient of the product, comprising a protein fraction purified from an adipose-derived stem cell conditioned medium, and a reconstitution composition, for reconstituting the dried protein component just before application to the skin. The two components are kept separate during production, shipping and storage, and mixed directly before use.

The protein composition of the present invention comprises a protein fraction comprising proteins and particles that remained after concentration and separation to remove components smaller than 1 kDa. In some embodiments, the protein fraction comprises proteins and particles that remained after concentration and separation to remove components smaller than 3 kDa. In some particular embodiments, the protein fraction is obtained from an adipose-derived stem cell conditioned medium using Tangential Flow Filtration (TFF) with an appropriate molecular weight cutoff (e.g., 1 kDa or 3 kDa). A protein fraction according to the present invention was found to be highly effective in softening the skin and reducing the depth of wrinkles, already after 6 weeks of use.

The present invention therefore provides effective anti-aging cosmetic products with improved stability and prolonged shelf-life.

Adipose-Derived Stem Cell Isolation and Preparation of a Conditioned Medium

An exemplary process for obtaining adipose-derived stem cells (ADSCs) from subcutaneous fat is described in the Examples section below. Generally, ADSCs may be obtained from subcutaneous fat by a process comprising:
(a) obtaining a lipoaspirate;
(b) dissociating the lipoaspirate with a tissue-dissociation enzyme or by mechanical disruption;
(c) pelleting a cellular fraction comprising the ADSCs by centrifugation, and optionally washing the pellet with a suspension medium capable of supporting cell viability (e.g., with an isotonic buffer or a culture medium) and subjecting the suspension to at least one additional centrifugation;
(d) resuspending the pellet obtained in step (c) in a suspension medium capable of supporting cell viability (e.g., an isotonic buffer or a culture medium) and selecting ADSCs from the population of cells in the resuspended pellet;
(e) optionally conducting at least one filtration prior to the ADSC selection; and (f) optionally culturing the ADSCs for at least 3 passages.

In some embodiments, a fresh lipoaspirate is used. In other embodiments, a frozen lipoaspirate is used. According to these embodiments, obtaining ADSCs may include the following steps:
(a) freezing a lipoaspirate;
(b) thawing the lipoaspirate and dissociating with a tissue-dissociation enzyme or by mechanical disruption;
(c) pelleting a cellular fraction comprising the ADSCs by centrifugation, and optionally washing the pellet with a suspension medium capable of supporting cell viability (e.g., with an isotonic buffer or a culture medium) and subjecting the suspension to at least one additional centrifugation;
(d) resuspending the pellet obtained in step (c) in a suspension medium capable of supporting cell viability (e.g., an isotonic buffer or a culture medium) and selecting ADSCs from the population of cells in the resuspended pellet;
(e) optionally conducting at least one filtration prior to the ADSC selection; and (f) optionally culturing the ADSCs for at least 3 passages.

The present invention utilizes adipose-derived mesenchymal stem cells, particularly human adipose-derived mesenchymal stem cells. As used herein, the terms "adipose-derived mesenchymal stem cells" or "adipose-derived stem cells", abbreviated "ADSCs" or "hADSCs" (i.e., human adipose-derived stem cells), refer to plastic-adherent, multipotent cell population harvested from adipose tissue. The cell population is characterized by positive expression of CD73, CD90 and CD105 by at least 90% of the cells, and positive expression of CD45 by less than 5% of the cells. The population of human adipose-derived stem cells is typically further characterized by at least 70% viability and fibroblast like morphology.

Characterization of cell surface marker expression can be performed by methods known in the art, for example using fluorescence-activated cell sorting (FACS). FACS protocols are reviewed, for example, in: Flow Cytometry Protocols, Methods in Molecular Biology Volume 699 2011, Editors: Teresa S. Hawley, Robert G. Hawley Humana Press. Exemplary procedures are described below.

The ADSCs according to the present invention are preferably non-genetically modified.

The ADSCs according to embodiments of the present invention are derived from human subcutaneous fat. According to particular embodiments, the cells are derived from human subcutaneous fat obtained by liposuction aspiration. The ADSCs may be obtained by liposuction procedures in various areas of the body including stomach, hips, thighs, arms, neck and buttocks. Any procedure of liposuction may be used according to the present invention for obtaining ADSCs, including but not limited to laser, ultrasound and fat removal by abdominoplasty.

The adipose tissue is processed to isolate the adipose-derived stem cells. Preparation methods typically include steps of washing the tissue with buffers such as PBS and saline, and/or with growth media (typically without any additives such as external cytokines or growth factors) e.g. DMEM, StemMACS™ or Plasma-Lyte, and treating the tissue with a tissue-dissociation enzyme such as collagenase and/or subjecting the tissue to non-enzymatic mechanical disruption, for example, using devices such as Tulip Nano Transfer™. Enzymatic digestion of the sample can also be performed using a combination of dispase and collagenase. Liposomes, which are generally aggregated, can be separated from free stromal cells which include the stem cells and other cells such as red blood cells, endothelial cells, and fibroblast cells, by centrifugation. Erythrocytes may be lysed from the suspended pellet using a suitable lysis buffer and the remaining cells can be filtered or centrifuged.

In some embodiments, the ADSCs may be obtained without applying a buffer to cause lysis of red blood cells originally found in the lipoaspirate. Thus, in some embodiments, the lipoaspirate is processed to isolate adipose-derived stem cells without applying a red blood cells lysis buffer. A method for isolating the adipose-derived stem cells without a red blood cell lysis buffer comprises freezing and thawing the adipose tissue prior to further processing, as described in WO 2018/211498, assigned to the Applicant of the present invention. In other embodiments, a red blood cells lysis buffer is applied after pelleting a cellular fraction comprising the hADSCs by centrifugation and prior to selecting hADSCs from the population of cells.

Freezing of a lipoaspirate according to some embodiments is performed as follows: a lipoaspirate is placed in a freezing bag and DMSO is added at a final concentration of 10%. The freezing bag is placed in a freezing canister and the sample is kept at −80° C. overnight (~24 hours). The frozen sample is then transferred to a vapor phase liquid nitrogen tank. Stability tests can be performed during the storage period. For thawing, according to some embodiments, the sample is taken out and left at room temperature for a few minutes, typically 5-10 minutes. The sample is then thawed in a water bath at 37° C. for a few minutes, typically between 5-10 minutes, or until most of the sample is thawed. The sample is then washed with a suspension medium capable of supporting cell viability, defined herein as an isotonic buffer or culture medium suitable for mesenchymal stem cells, for example, a buffer, such as PBS, at 37° C. The sample is typically washed twice.

In some embodiments, the process comprises conducting at least one filtration. Filtration is performed, in some embodiments, through a 100 micron mesh and subsequently through a 40 micron mesh in order to further dissociate the tissue and facilitate collection of the SVF fraction.

In order to isolate the ADSCs from within the population of cells in the SVF fraction, processes such as selection by adherence to a cell culture vessel (e.g. by plastic adherence) and/or via beads/antibodies are typically applied. Optionally, cells may be separated by cell sorting or separated immunohistochemically. Bunnell et al. (2008) Methods., 45(2): 115-120, review methods for isolation of ADSCs.

Selection by adherence to the culture vessel is typically carried out by: seeding the SVF cells in a culture flask (e.g. plastic flask) with a suitable culture medium without any coating; incubating the seeded cells overnight (in some embodiments for at least 12 hours, or between 24-48 hours); washing the flask to remove non-adherent cells and tissue debris; and adding fresh culture medium to the flask. The adherent cells (ADSCs) may be cultured to a desired level of confluency, following which they may be collected and stored or sub-cultured to further passages. Typically, the cells are sub-cultured to a passage number between 3-10, preferably between 3-5 or 3-4. The cells may be stored frozen until use.

For production of a conditioned medium, a sample of frozen cells is thawed and the cells are seeded in a cell culture vessel and cultured in a cell culture medium—first in a serum-containing cell culture medium and subsequently in a serum-free cell culture medium. The cell culture media are those that adequately address the nutritional needs of the cells being cultured. Culture media for mesenchymal stem cells are commercially available. For example, the media may be based on Dulbecco's Modified Eagle's Medium (DMEM), with or without added serum. As the serum, fetal bovine serum (FBS) may be added. DMEM used without added FBS is a serum-free medium. The FBS, along with L-glutamine and an antibiotic (e.g., gentamicin-sulfate), may be added to the DMEM medium to obtain a "complete serum medium" or "complete medium".

In some embodiments, the cells are cultured in the serum-containing medium for approximately 24 hours, after which the medium is exchanged with a serum-free medium. The serum-free medium is preferably an animal product-free medium (xeno-free).

The cell culture is preferably performed in an incubator at a temperature of 35-39° C. under a condition of 5±1% $CO_2$. The cell culture is typically a two-dimensional cell culture.

Once the culture medium is incubated with cells, it is known to those skilled in the art as "spent" or "conditioned medium". Conditioned medium contains many of the original components of the medium, as well as a variety of cellular metabolites and secreted proteins, including, for example, biologically active growth factors.

The cells are cultured in the serum-free medium for at least 48 hours and preferably no more than 72 hours prior to collection of the medium. In some embodiments, the cells are cultured in the serum-free medium for 48-96 hours prior to collection of the medium. In other embodiments, the cells are cultured in the serum-free medium for 48-72 hours prior to collection of the medium. Following incubation in the serum-free medium, the cells and any cell debris are separated from the medium (e.g., by centrifugation or filtration) and the conditioned medium is collected. The collected conditioned medium may be processed immediately after collection or stored frozen until use.

Purification of a Protein Fraction and Production of a Dried Protein Composition The protein fraction of the present invention is obtained by processing the conditioned medium to remove components smaller than 1 kDa, preferably by removing components smaller than 3 kDa. The protein fraction is preferably purified from ingredients of the cell culture medium and formulated with cosmetic excipients. The following sections describe the purification of a protein fraction according to some embodiments of the present invention, which are based on concentration, filtration and diafiltration using a Tangential Flow Filtration (TFF) system. A person of skill in the art would appreciate that other methods for purifying the protein fraction may be used with the present invention, including for example, centrifugal filtration, dialysis, precipitation and combinations thereof.

The conditioned medium (fresh or thawed) is preferably subjected to concentration to obtain a desired volume of concentrated conditioned medium. The concentration factor typically ranges from 2-10, depending on the initial volume of the conditioned medium. The concentration of the conditioned medium may be carried out before or during the purification of the protein fraction.

In some embodiments, the conditioned medium is processed using a Tangential Flow Filtration (TFF) system, to concentrate the conditioned medium and remove components smaller than 1 kDa, preferably to remove components smaller than 3 kDa. The purified protein fraction is obtained as a retentate. In some embodiments, the conditioned medium is processed using a TFF system with a molecular weight cutoff of 1 kDa. In additional embodiments, the conditioned medium is processed using a TFF system with a molecular weight cutoff of 3 kDa. In some embodiments, higher molecular weight cutoffs may be used, up to 10 kDa (e.g., a 5 kDa cutoff or a 10 kDa cutoff).

The retentate (the purified protein fraction) comprises proteins, including various growth factors, and exosomes. In some embodiments, the exosome content of the protein fraction is at least $10^9$ exosomes per 1 mg of total protein. In additional embodiments, the exosome content of the protein fraction is at least $10^8$ exosomes per 1 mg of total protein.

In some embodiments, the retentate (the protein fraction) is subjected to diafiltration in order to replace the conditioned medium with a liquid formulation comprising cosmetic excipients, and obtain a purified protein fraction formulated with the cosmetic excipients.

In some embodiments, to purify the protein fraction from the conditioned medium, filtration is carried out using a filtration system with a molecular weight cutoff of 1 kDa, to obtain a retentate from which molecules and particles smaller than 1 kDa have been removed. In some embodiments, filtration is carried out using a filtration system with a molecular weight cutoff of 3 kDa, to obtain a retentate from which molecules and particles smaller than 3 kDa have been removed. In some embodiments, higher molecular weight cutoffs may be used, up to 10 kDa (e.g., a 5 kDa cutoff or a 10 kDa cutoff).

In some embodiments, the protein fraction is a protein fraction purified from the human adipose-derived stem cell conditioned medium by filtration with a molecular weight cutoff of 1 kDa. In some embodiments, the protein fraction is a protein fraction purified from the human adipose-derived stem cell conditioned medium by filtration with a molecular weight cutoff of 3 kDa. In some embodiments, higher molecular weight cutoffs may be used, up to 10 kDa (e.g., a 5 kDa cutoff or a 10 kDa cutoff).

The purified protein fraction is also referred to herein as "mesenchymal growth factor (MGF) fraction", "MGF preparation" and the like.

The purified protein fraction as disclosed herein is substantially free of components originating from the cell culture medium, such as various metals, as exemplified hereinbelow. For example, the protein fraction is substantially devoid of Mg, Ca and K. Thus, the dried (e.g. lyophilized) protein composition of the present invention is substantially devoid of Mg, Ca and K. As used herein, "substantially devoid" indicates amounts below detectable amounts, for example, below 1 mg/kg for Ca and K, and below 0.2 mg/kg for Mg.

The liquid formulation comprising the purified protein fraction and cosmetic excipients is then subjected to drying, for example, lyophilization (also called "freeze-drying") to obtain a dried (e.g. lyophilized) protein composition in a powder form. A dried protein composition according to the present invention preferably contains less than 5% wt residual water. In some embodiments, the dried protein composition contains less than 2% wt residual water.

In some embodiments, there is provided herein a process for producing a cosmetic composition comprising a protein fraction purified from a human adipose-derived stem cell conditioned medium, the process comprises: obtaining human adipose-derived stem cells (hADSCs); culturing the hADSCs in a serum-containing medium for at least 24 hours; sub-culturing the hADSCs in a serum-free medium for at least 48 hours to obtain a conditioned medium; separating the hADSCs (including cell debris) and collecting the conditioned medium; concentrating the conditioned medium and removing components smaller than 1 kDa to obtain a protein fraction; formulating the protein fraction with cosmetic excipients; and drying (e.g. lyophilizing) the formulated protein fraction.

In some embodiments, there is provided herein a process for producing a cosmetic composition comprising a protein fraction purified from a human adipose-derived stem cell conditioned medium, the process comprises: obtaining human adipose-derived stem cells (hADSCs); culturing the hADSCs in a serum-containing medium for at least 24 hours; sub-culturing the hADSCs in a serum-free medium for at least 48 hours to obtain a conditioned medium; separating the hADSCs (including cell debris) and collecting the conditioned medium; concentrating the conditioned medium and removing components smaller than 3 kDa to obtain a protein fraction; formulating the protein fraction with cosmetic excipients; and drying (e.g. lyophilizing) the formulated protein fraction.

In some embodiments, concentrating the conditioned medium and removing components smaller than 1 kDa is carried out using a filtration system with a molecular weight cutoff of 1 kDa. In some embodiments, concentrating the conditioned medium and removing components smaller than 1 kDa is carried out using a Tangential Flow Filtration (TFF) system with a molecular weight cutoff of 1 kDa.

In some embodiments, concentrating the conditioned medium and removing components smaller than 3 kDa is carried out using a filtration system with a molecular weight cutoff of 3 kDa. In some embodiments, concentrating the conditioned medium and removing components smaller than 3 kDa is carried out using a Tangential Flow Filtration (TFF) system with a molecular weight cutoff of 3 kDa.

In some embodiments, formulating the protein fraction with cosmetic excipients is carried out using dialysis. In some embodiments, formulating the protein fraction with cosmetic excipients is carried out using diafiltration.

In some embodiments, there is provided herein a cosmetic composition produced by the process of the present invention.

In some embodiments, there is provided herein a two-component cosmetic product comprising the dried (e.g. lyophilized) protein composition obtained by the process of the present invention and a reconstitution composition.

Dried (e.g. Lyophilized) Protein Composition

The terms "protein composition" or "protein component" are used herein interchangeably and refer to a preparation of the protein fraction of the present invention (namely, a protein fraction purified from an adipose-derived stem cell conditioned medium) with one or more cosmetically acceptable excipients designed to maintain stability and facilitate the reconstitution for application of the protein fraction to the skin of a subject. The subject according to the present invention is typically a human subject.

The term "cosmetically acceptable excipients" as used herein refers to excipients that do not cause significant irritation to the skin and do not abrogate the beneficial activity and properties of the protein faction of the present invention.

Figure 11:
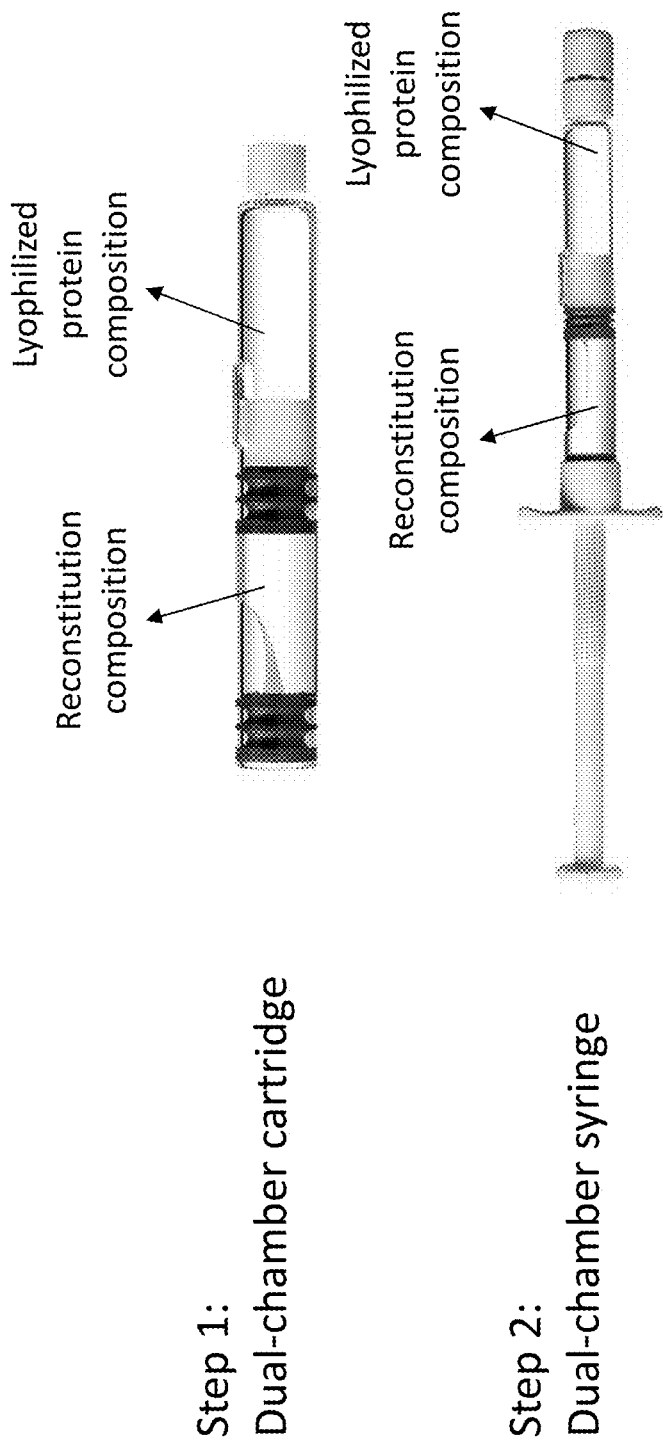
FIG. 11. Cosmetic product according to some embodiments of the present invention, provided as a prefilled syringe.

In some embodiments, the cosmetic product of the present invention is provided as a pair of vials, namely, a protein vial, containing the dried (e.g. lyophilized) protein composition, and a reconstitution vial, containing the reconstitution composition, where the amounts in each vial are suitable for mixing and reconstitution to obtain a cosmetic composition suitable for application to the skin. In other embodiments, the cosmetic product of the present invention is provided as a prefilled syringe, as illustrated for example in FIG. 11. In the illustrated example, the prefilled syringe comprises: a first chamber comprising the aqueous reconstitution composition; a second chamber comprising the dried (e.g. lyophilized) protein composition; and a plunger, wherein upon movement of the plunger the aqueous reconstitution composition is delivered from the first chamber into the second chamber and mixed with the dried protein composition for reconstitution.

In some embodiments, the protein content of a dried (e.g. lyophilized) protein composition according to the present invention is at least 0.2 µg/mg powder. In additional embodiments, the protein content of the dried (e.g. lyophilized) protein composition is at least 0.25 µg/mg powder. In some embodiments, the protein content of the dried (e.g. lyophilized) protein composition is in the range of 0.2-0.5 µg/mg powder.

The protein content of a ready-to mix dried (e.g. lyophilized) protein composition of the present invention is preferably at least 0.2 µg/mg powder, meaning that the protein content of an aliquot of a dried protein composition that is ready for mixing with a reconstitution composition (e.g., a vial comprising the lyophilized protein composition or a syringe chamber comprising the protein composition) is at least 0.2 µg per mg powder. In additional embodiments, the protein content of the dried protein composition is at least 0.25 µg/mg powder. In some embodiments, the protein content of the dried protein composition is in the range of 0.2-0.5 µg/mg powder.

In some embodiments, the protein composition of the present invention is devoid of non-human animal proteins.

The excipients included in the protein composition typically comprise a bulking agent. Bulking agents are typically used in order to add mass to a dried (e.g. lyophilized) formulation. A bulking agent may contribute to the physical structure, uniformity, and stability of the dried (e.g. lyophilized) cake. The term "cake" refers to a dry pellet that results when a liquid formulation has been dried (e.g. lyophilized) as described herein. Bulking agents are particularly needed for potent biologic agents that require low amounts per vial. Often, the bulking agent can also provide additional functions in the formulation, such as a stabilizer and/or a tonicity agent.

Examples of suitable bulking agents for dried formulations of peptides and/or proteins include sugars such as mannitol, sorbitol, lactose, glucose, sucrose and trehalose. Each possibility represents a separate embodiment of the present invention. Other examples of bulking agents for dried formulations of peptides and/or proteins include amino acids such as histidine, arginine and glycine. Each possibility represents a separate embodiment of the present invention. Some of these can also serve as buffering agents and/or stabilizers. Albumin is yet another excipient that can serve as a bulking agent as well as a stabilizer. According to some preferred embodiments, the bulking agent used in the protein compositions of the present invention is other than a protein. In some embodiments, the bulking agent comprises a sugar. In some embodiments, the bulking agent is a sugar.

The excipients included in the protein composition typically also comprise a tonicity agent. It is generally desired for the cosmetic compositions of the present invention to be isotonic upon mixing and before application to the skin. Sodium chloride salt is an example of a tonicity agent. The final composition and reconstitution volume should be chosen to achieve isotonicity.

In some embodiments, the protein compositions of the present invention comprise a sugar as the bulking agent, which also serves as a tonicity agent. For example, mannitol is a sugar bulking agent which also serves as a tonicity agent. In some embodiments, the protein compositions comprise a sugar bulking agent and at least one tonicity agent, such as sodium chloride.

Additional excipients that may be added/included in the protein compositions of the present invention include: stabilizers (e.g., EDTA), buffering agents such as citrates (e.g., sodium citrate), phosphates (e.g., sodium dihydrogen phosphate monohydrate), Tris, and acetates, antioxidants (e.g., ascorbic acid, citric acid), surfactants such as non-ionic surfactants (e.g., polysorbates) and combinations thereof. Each possibility represents a separate embodiment of the present invention.

In some embodiments, the at least one cosmetically acceptable excipient in a protein composition according to the present invention comprises at least one bulking agent, at least one stabilizer and at least one tonicity agent.

As noted above, in some embodiments, the protein fraction is purified from the conditioned medium and formulated in a liquid formulation (an aqueous formulation) comprising the cosmetic excipients, and subsequently the liquid formulation is subjected to drying (e.g. lyophilization). In some embodiments, the protein fraction purified from the conditioned medium is subjected to diafiltration in order to formulate the protein fraction with the aqueous formulation.

In some embodiments, the aqueous formulation comprises between 2%-10% (w/v) of a bulking agent or a combination of bulking agents, for example between 2%-5% (w/v) of a bulking agent or a combination of bulking agents, including each value within the specified ranges. In some embodiments, after drying (e.g. lyophilization), the dried (e.g. lyophilized) protein composition comprises between 70%-85% (w/w) of the bulking agent or combination of bulking agents.

In some embodiments, the aqueous formulation comprises between 0.01-1% (w/v) of a stabilizer such as EDTA, for example, between 0.025-0.5% (w/v) of the stabilizer, including each value within the specified ranges. In some embodiments, after drying (e.g. lyophilization), the dried (e.g. lyophilized) protein composition comprises between 1.0%-1.5% (w/w) of the stabilizer.

In some embodiments, the aqueous formulation comprises between 0.1-1% (w/v) of a tonicity agent, for example between 0.25%4% (w/v) of a tonicity agent, including each value within the specified ranges. In some embodiments, after drying (e.g. lyophilization), the dried (e.g. lyophilized) protein composition comprises between 10%-15% (w/w) of the tonicity agent.

Formulation and lyophilization of protein/peptide-based products is reviewed, for example, in: Costantino and Pikal Eds. Lyophilization of Biopharmaceuticals, Springer Science & Business Media, 2004; and Pearlman and Wang Eds. Stability and Characterization of Protein and Peptide Drugs: Case Histories, Springer Science & Business Media, 29 Jun. 2013.

Reconstitution Composition

The terms "reconstitution composition" or "reconstitution medium" and the like are used herein interchangeably and refer to an aqueous composition comprising one or more cosmetically acceptable excipients that facilitate reconstitution of the dried protein composition and application to the skin of a subject.

The excipients included in the reconstitution composition typically comprise emulsifiers and emollients, and optionally also a thickener, a buffering or pH adjusting agent, a humectant, and combinations thereof. Each possibility represents a separate embodiment. Additional excipients that may be included comprise a surfactant, an anti-oxidant, a fragrance, a colorant and combinations thereof. Each possibility represents a separate embodiment. The reconstitution compositions of the present invention typically comprise an antimicrobial preservative.

Suitable emulsifiers include, but are not limited to, polyethylene glycol ethers of stearic acid such as steareth-2, steareth-4, steareth-6, steareth-7, steareth-10, steareth-11, steareth-13, steareth-15, and steareth-20, glyceryl stearate, stearyl alcohol, cetyl alcohol, cetearyl alcohol, behenyl alcohol, diethanolamine, lecithin, polyethylene glycols and combinations thereof. Each possibility represents a separate embodiment. Combinations of emulsifiers are available commercially, for example under the trademarks Dow Corning® 5225C (DC 5225C), Montanov™ 68, Emulium® Delta.

Suitable emollients include fats, oils, fatty alcohols, fatty acids and esters which aid application and adhesion, yield gloss and provide occlusive moisturization. Examples include, but are not limited to, silicone oils (for example, those available under the trademarks Dow Corning® 245 (DC 245) and Dow Corning® 246 (DC 246), glycerin, hydrocarbon oils and waxes, including mineral oil, petrolatum, paraffin, ceresin, ozokerite, microcrystalline wax, polyethylene, and perhydrosqualene; triglyceride fats and oils, including those derived from vegetable, animal and marine source including jojoba oil and shea butter; acetoglyceride esters, such as acetylated monoglycerides; ethoxylated glycerides, such as ethoxylated glyceryl monostearate; fatty acids, fatty alcohols and derivatives thereof, such as isopropyl myristate. Each possibility represents a separate embodiment.

Suitable thickeners include, but are not limited to, various polymers such as polyacrylic acid, polymethacrylic acid, acrylamides copolymer, sodium acrylates copolymer, sodium alginate, calcium alginate, magnesium alginate, alginic acid, hyaluronic acid, polyglucuronic acid (poly-α- and -β-1,4-glucuronic acid), chondroitin sulfate, furcellaran, carboxymethylcellulose, polycarboxylic acids, carbomer, bentonite, chitin, chitosan, carboxymethyl chitin, and cross-linked polyacrylate materials available under the trademark Carbopol®, as well as polymers such as hydroxypropyl methylcellulose (HPMC), hydroxypropyl cellulose (HPC), hydroxymethyl cellulose, hydroxyethyl cellulose, methyl cellulose, calcium carboxymethyl cellulose, polyvinylpyrrolidone (povidone, PVP), polyvinyl alcohol, medium to high molecular weight polyethylene glycols (PEG-3350, PEG-6000, etc.), glucosides and tetrasodium etidronate. Each possibility represents a separate embodiment of the present invention.

Suitable buffering or pH adjusting agents include, but are not limited to, acidic buffering agents such as short chain fatty acids, citric acid, acetic acid, hydrochloric acid, sulfuric acid and fumaric acid; and basic buffering agents such as tris, sodium carbonate, sodium bicarbonate, sodium hydroxide, potassium hydroxide, and magnesium hydroxide. Each possibility represents a separate embodiment.

Suitable humectants include, but are not limited to, glycols such as triethylene glycol, tripropylene glycol, propylene glycol, polypropylene glycols, butylene glycol, polyethylene glycols, sugar alcohols such as sorbitol, hexylene, urea, and collagen. Each possibility represents a separate embodiment.

Examples of cosmetically acceptable antimicrobial preservatives include formaldehyde releasers (e.g., imidazolidinyl urea), parabens (e.g., methylparaben, propylparaben), isothiazolinones (e.g., kathon), phenoxyethanol (e.g., optiphen) and organic acids (e.g., benzoic acid/sodium benzoate, sorbic acid/potassium sorbate). Each possibility represents a separate embodiment of the present invention.

The cosmetic compositions and products of the present invention are useful for skin rejuvenation, improving skin appearance, skin tone and the like. In particular, the cosmetic compositions and products of the present invention are useful in improving various skin conditions, including for example wrinkles, fine lines, skin imperfections, spots including lentigines or solar lentigines, uneven skin tone or texture, UV radiation-induced damaged skin or photodamaged skin, hyperpigmented skin or melasmas, dry skin, sagging skin, rough skin, and any combination thereof.

The following examples are presented in order to more fully illustrate certain embodiments of the invention. They should in no way, however, be construed as limiting the broad scope of the invention. One skilled in the art can readily devise many variations and modifications of the principles disclosed herein without departing from the scope of the invention.

EXAMPLES

Example 1

Production of a Protein Fraction According to the Present Invention

1. Lipoaspirate Tissue Cryopreservation
Lipoaspirate Tissue Preparation

A lipoaspirate sample is taken and the aqueous layer at the bottom of the container (below the floating tissue) is removed. The remaining tissue is transferred into a 500 ml/1000 ml sterile bottle.

Lipoaspirate Tissue Wash

Tissue volume (ml) is estimated and cold PBS in an equivalent volume is added to the bottle containing the tissue. The bottle is closed, inverted and gently swirled to encourage separation of the layers and to assist in the washing procedure. The bottle is then placed straight and the two phases are allowed to separate. Next, the aqueous layer formed below the fat tissue is removed. The aforementioned wash with PBS is repeated three more times.

Lipoaspirate Tissue Cryobagging

The yellow thin layer formed at the top of the tissue (if any) is carefully aspirated and discarded. The actual fat tissue volume (ml) is measured and accordingly the number of cryobags that are needed is calculated. Next, 150 ml (or other remaining volume) of fat tissue are transferred to each cryobag. Tissue lumps are not collected into the syringes to avoid clogging. Any tissue that remains is discarded.

DMSO Solution Preparation

The required volume of 50% DMSO solution is calculated as follows:

$$\text{DMSO solution volume} = 0.27 \text{ ml} \times \text{actual fat tissue volume}$$

The required volume of 50% DMSO solution is prepared by mixing equal volumes of 100% DMSO and PBS, both at 22±5° C. The resulting 50% DMSO solution is kept in ice until use.

DMSO Solution Addition 0.25 ml cold 50% DMSO solution is slowly added per 1 ml tissue in each cryobag (i.e., for a 150 ml tissue, 37.5 ml of 50% DMSO solution are added). The DMSO is equally distributed by gently hand-pressing and massaging the cryobag while the DMSO is added. The freezing bag's tube is sealed twice at ~2 cm and ~4 cm and cut after the second sealing point. Each cryobag is placed into a corresponding freezing bag and the secondary freezing bag is sealed. Each freezing bag is transferred to a freezing canister, placed in a −80° C. freezer and stored for 18-24 hours.

For long-term storage, the freezing canisters are transferred from the −80° C. freezer to a vapor phase nitrogen storage container.

2. Lipoaspirate Tissue Thawing and Stromal Vascular Fraction (SVF) Isolation

Preparation of Solutions

A 5% collagenase stock solution (50 mg/ml) is prepared (in PBS).

Cell Culture Media Preparation

DMEM LG complete medium is prepared by adding L-glutamine, FBS and gentamycin-sulfate to DMEM LG. The prepared DMEM LG complete growth medium is kept at 2-8° C. until use.

DMEM LG medium w/o FBS is prepared by adding only L-glutamine and gentamycin-sulfate to DMEM LG. The prepared growth medium is kept at 2-8° C. until use.

Lipoaspirate Tissue Thawing

PBS is warmed in a 37±1° C. water bath. The canisters containing the cryobags to be thawed are removed from the vapor nitrogen tank/−80° C. freezer and opened. The cryobags are taken out from their canisters and kept at room temperature for 5±0.5 minutes. The cryobags are then placed in a 37±1° C. water bath for 5±0.5 minutes. Next, each cryobag is dried and opened. The tissue is transferred to a 500 ml sterile bottle and washed twice with an equivalent volume of pre-warmed PBS.

Tissue Processing and Stromal Vascular Fraction (SVF) Isolation

The washed tissue is transferred to a 500 ml centrifuge tube. The approximate tissue volume (ml) is recorded. For 150 ml tissue, 7.5 ml of 5% collagenase stock solution are added into a sterile bottle. Next, 0.6 ml of 1M $CaCl_2$ stock solution and 142 ml PBS are added to the collagenase containing bottle (final volume 150 ml). The collagenase containing bottle is warmed in a 37±1° C. water bath for ~15 minutes. The collagenase solution in the bottle is then added to the centrifuge tube containing the tissue in a 1:1 v/v ratio (collagenase: tissue) and the centrifuge tube is swirled for ~10 seconds. The centrifuge tube is then placed in the 37±1° C. water bath with shaking (130 rpm) for ~35 minutes. Next, the centrifuge tube is removed from the water bath and DMEM LG media w/o FBS is added at RT (200 ml of DMEM LG media w/o FBS for every 150 ml initial tissue). The centrifuge tube is closed and centrifuged for 10 minutes at 500×g, 21±2° C. Following centrifugation most of the supernatant is removed, leaving ~5 ml, and the pellet is resuspended by pipetting up and down and subsequently transferred into a 50 ml conical tube. Next, 45 ml of DMEM L/G w/o FBS are added to the 50 ml conical tube and the conical tube is centrifuged for 10 minutes at 500×g, 21±2° C., using a table top centrifuge. Following centrifugation, the supernatant is removed and discarded. The cell pellet is resuspended in 10 ml red cell lysis buffer and incubated for 10±1 minutes at room temperature. Next, 20 ml of PBS are added (RT) and the sample is centrifuged for 10 minutes at 500×g, 21±2° C. The cell pellet is resuspended in 5 ml DMEM LG media w/o FBS. A 100 µm cell strainer is placed on top of a new 50 ml tube and the suspension is filtered. The filtrate is centrifuged for 10 minutes at 500×g, 21±2° C. using a table top centrifuge. The supernatant is discarded and the cell pellet is resuspended in 5 ml DMEM LG media w/o FBS. A second filtration is then carried out by placing a 40 µm cell strainer on top of a new 50 ml tube and filtering the suspension. The filter is washed with an additional 5 ml DMEM LG media w/o FBS and the filtrate is centrifuged for 10 minutes at 500×g, 21±2° C. using a table top centrifuge. The supernatant is discarded and the cell pellet is resuspended in 5 ml complete DMEM LG media (~37° C.). The resulting sample is referred as stromal vascular fraction (SVF).

SVF Cell Count

A 200 µl sample of 1:10 diluted cell suspension is prepared in an Eppendorf tube by transferring 20 µl of the cell suspension into 180 µl complete DMEM LG and the cells are counted.

SVF Seeding

Cells are seeded in cell culture flasks without any coating at a concentration of ~3.5×10$^5$ cells/cm$^2$:

For a 175 cm$^2$ flask, 6×10$^6$ cells are seeded

For a 75 cm$^2$ flask, 2.6×10$^6$ cells are seeded.

35 ml complete DMEM LG are added to each 175 cm$^2$ flask. 15 ml complete DMEM LG are added to each 75 cm$^2$ flask. The flask(s) are incubated in an incubator 5±1% $CO_2$, 37±2.5° C. overnight to select for plastic adherent cells (adipose-derived stem cells, ADSCs).

Medium Exchange

Complete DMEM LG and PBS bottles are pre-warmed in a 37±1° C. water bath for 30±5 minutes. Cell flask(s) are removed from the incubator and the medium is aspirated from the flask(s). Cells are washed twice to remove non-adherent cells and tissue debris by carefully adding 5 ml of warm PBS per 75 cm$^2$ flask or 10 ml per 175 cm$^2$ and subsequently aspirating the PBS using a sterile pipette. Next, complete DMEM LG is added, 15 ml per 75 cm$^2$ flask or 35 ml per 175 cm$^2$ flask, and the flasks are incubated in an incubator 5±1% $CO_2$, 37±2.5° C.

Cells are grown 70%-100% cell confluency with medium exchange every 2-3 days.

3. Harvest and Re-Culture of Mesenchymal Stem Cells

Growth Medium Preparation

NutriStem® growth medium is prepared by adding L-glutamine, NutriStem® supplement and gentamycin-sulfate to NutriStem®. The prepared NutriStem® growth medium is warmed in a 37±1C° water bath for 30±5 minutes.

Coating of Cell Culture Flasks

MSC Attachment Solution (Biological Industries), composed of sterile, affinity purified human fibronectin (hFN) that supports the attachment and spreading of human mesenchymal stem cells (hMSC) cultured in serum-free medium is prepared by dissolving concentrated Attachment Solution 1:100 with sterile PBS. The prepared Attachment Solution is kept at room temperature and used during the same day of flask coating. The prepared Attachment Solution is transferred to 175 cm$^2$ flasks (10 ml) or 75 cm$^2$ flasks (5 ml). It is verified that the Attachment Solution is well dispersed on the flasks by gently tilting them. The coated flasks are transferred to a 5±1% $CO_2$, 37±2.5° C. incubator for at least 30 minutes.

Harvest of Cells

The prepared NutriStem® growth media is removed from the water bath. The cell containing flasks are carefully removed from the incubator and the medium is aspirated from the flasks. Each flask is washed with PBS (10 ml PBS for a 175 cm$^2$ flask and 5 ml PBS for a 75 cm$^2$ flask) and subsequently the PBS is aspirated. Next, the cells are trypsinized by adding TrypLE™ to each flask at room temperature (10 ml to a 175 cm$^2$ flask and 5 ml to a 75 cm$^2$ flask) and incubating the flasks at a 5±1% $CO_2$, 37±2.5° C. incubator for up to 10 minutes. The flasks are then removed from the incubator and observed under a microscope to see if most cells were detached. If not, the flasks are tapped-on gently to detach the remaining cells. If necessary, trypsinization is repeated. Following trypsinization NutriStem® growth media is added to each flask (10 ml to each 175 cm$^2$ flask and 5 ml to each 75 cm$^2$ flask) and the suspension is pipetted gently up and down to wash the tissue culture flask. The suspension is then transferred to a 50 ml tube and the tube is centrifuged for 10 minutes at 400×g, 21±2° C. Following centrifugation, the supernatant is carefully aspirated and the cell pellet is resuspended with 5 ml of NutriStem® growth media and the cells are counted. The procedure proceeds only if cell viability is >75%.

Re-Culture of Cells

The seeding volume for each flask is calculated as follows:

$$\text{Seeding volume in } 175\text{cm}^2 = (0.875 \times 10^6 \text{cells}) / \left(\text{Viable} \frac{\text{cells}}{\text{ml}}\right)$$

$$\text{Seeding volume in } 75\text{cm}^2 = (0.375 \times 10^6 \text{cells}) / \left(\text{Viable} \frac{\text{cells}}{\text{ml}}\right)$$

The pre-coated cell culture flasks are removed from the incubator and the attachment solution is aspirated. Each flask is then washed with PBS at room temperature (10 ml of PBS for a 175 cm$^2$ flask, 5 ml for a 75 cm$^2$), the PBS is aspirated, and NutriStem® growth media is added to each flask (35 ml to a 175 cm² flask and 15 ml to a 75 cm² flask). Cells are seeded in each flask as calculated above and the flasks are transferred to a 5±1% CO₂, 37±2.5° C. incubator.

Cell Growth Evaluation

The cell containing flasks are carefully removed from the incubator and growth of the cells is evaluated under a microscope. In particular, the cells are checked for even spread, fibroblast-like morphology and 70-80% confluency. If the cells are evenly spread and/or 70-80% confluent they are harvested and re-cultured as described above. If the cells are not 70-80% confluent the growth medium is exchanged and the flasks are put back into the incubator. If cells do not have a fibroblast-like morphology and/or exhibit profound aggregation, the process is stopped and the cells are disposed. The cells are sub-cultured up to passage 3-5. The cells are stored frozen in liquid nitrogen until use.

4. Conditioned Medium Production

Growth Media Preparation

NutriStem® growth medium is prepared by adding L-glutamine, MSC NutriStem® supplement and gentamycin-sulfate to NutriStem®. The prepared NutriStem® growth medium is warmed in a 37±1° C. water bath for 30±5 minutes.

DMEM LG complete growth medium is prepared by adding FBS, L-glutamine and gentamicin-sulfate to DMEM LG. The prepared growth medium is kept at 2-8° C. until use.

Starvation medium is prepared by adding L-glutamine and gentamycin-sulfate to the DMEM LG. The prepared starvation medium is kept at 2-8° C. until use.

Coating of Cell Culture Flasks

MSC Attachment Solution (Biological Industries) is prepared by dissolving concentrated Attachment Solution 1:100 with sterile PBS. The prepared Attachment Solution is kept at room temperature and used during the same day of flask coating. The prepared Attachment Solution is transferred to 175 cm² flasks (10 ml) or 75 cm² flasks (5 ml). It is verified that the Attachment Solution is well dispersed on the flasks by gently tilting them. The coated flasks are transferred to a 5±1% CO₂, 37±2.5° C. incubator for at least 30 minutes.

Cell Sample Thawing

The pre-warmed NutriStem® growth medium is transferred to 15 ml tubes (8 ml per tube). Cryotubes containing cells to be thawed (with a total of 15·10^6 cells) are removed from the liquid nitrogen container and immediately placed in a 37±1° C. water bath. The cryotubes are gently swirled. When most of the medium has thawed (still some frozen material remains), the cryotubes are removed from the water bath and 1 ml of NutriStem® growth media is added dropwise to each cryotube at room temperature. The cell suspension is gently transferred back into the medium containing tube (total volume ~9 ml). The cryotube is then washed with an additional 1 ml of NutriStem® growth medium and the medium is transferred to the 15 ml tube. The total volume in the 15 ml tube is ~10 ml. Next, the 15 ml tube is centrifuged at 400×g for 10 minutes at 21±2° C. The supernatant is aspirated, the cell pellet is gently resuspended with 5 ml of NutriStem® growth medium, and the cells are counted. At the next stage, 200 µl of a 1:10 diluted cell suspension is prepared by adding 180 µl PBS or NutriStem® growth media to an Eppendorf tube and mixing with 20 µl of the cell suspension. The cells are counted again. The procedure proceeds only if cell viability is >75%.

Cell Seeding

The seeding volume for each flask is calculated as follows:

$$\text{Seeding volume in } 175 \text{cm}^2 = (0.875 \times 10^6 \text{cells}) / \left(\text{Viable} \frac{\text{cells}}{\text{ml}}\right)$$

$$\text{Seeding volume in } 75 \text{cm}^2 = (0.375 \times 10^6 \text{cells}) / \left(\text{Viable} \frac{\text{cells}}{\text{ml}}\right)$$

The pre-coated cell culture flasks are removed from the incubator and the Attachment Solution is aspirated. Each flask is then washed with PBS at room temperature (10 ml of PBS for a 175 cm² flask, 5 ml for a 75 cm²), the PBS is aspirated, and NutriStem® growth media is added to each flask (35 ml to a 175 cm² flask and 15 ml to a 75 cm² flask). Cells are seeded in each flask as calculated above and the flasks are transferred to a 5±1% CO₂, 37±2.5° C. incubator. The cells are incubated overnight (not more than 24 hours).

Growth Medium Exchange

NutriStem® growth medium is warmed in a 37±1° C. water bath for 30±5 minutes. The cell culture flasks are carefully removed from the incubator and the medium is aspirated from the flasks. Each flask is washed with PBS (5 ml of PBS for a 75 cm² flask and 10 ml for a 175 cm² flask), the PBS is aspirated, and NutriStem® growth medium is added (15 ml to a 75 cm² flask and 35 ml to a 175 cm² flask). The flasks are transferred back to the 5±1% CO₂, 37±2.5° C. incubator and the cells are grown 3-5 days or until cells reach ~80% confluency.

Harvest of Cells and Re-Culture in DMEM LG Complete Media

DMEM LG complete growth medium is wormed in a 37±1° C. water bath for 30±5 minutes. The cell containing flasks are carefully removed from the incubator and the medium is aspirated from the flasks. Each flask is washed with PBS (10 ml PBS for a 175 cm² flask and 5 ml PBS for a 75 cm² flask) and subsequently the PBS is aspirated. Next, the cells are trypsinized by adding TrypLE™ to each flask at room temperature (10 ml to a 175 cm² flask and 5 ml to a 75 cm² flask) and incubating the flasks at a 5±1% CO₂, 37±2.5° C. incubator for up to 10 minutes. The flasks are then removed from the incubator and observed under a microscope to see if most cells were detached. If not, the flasks are tapped-on gently to detach the remaining cells. If necessary, trypsinization is repeated. Following trypsinization, DMEM LG Complete growth medium is added to each flask (5 ml to a 75 cm² flask and 10 ml to a 175 cm² flask) and the suspension is pipetted gently up and down to wash the tissue culture flask. The suspension is then transferred to a 50 ml tube and the tube is centrifuged for 10 minutes at 400×g, 21±2° C. The washing step is repeated and the 50 ml tube is centrifuged for 10 min at 400×g, 21±2° C. The supernatant is carefully aspirated, the cell pellet is resuspended with 5 ml of DMEM LG Complete media, and the cells are counted. The procedure proceeds only if cell viability is >75%.

Cell Sample Seeding

DMEM LG Complete medium is added to cell culture flasks (10 ml to a 75 cm² flask and 23.3 ml to a 175 cm² flask). The seeding volume for each flask is calculated as set forth below and the cells are seeded:

$$\text{Seeding volume in } 175 \text{cm}^2 = (3.15 \times 10^6 \text{cells}) / \left(\text{Viable} \frac{\text{cells}}{\text{ml}}\right)$$

$$\text{Seeding volume in } 75 \text{cm}^2 = (1.35 \times 10^6 \text{cells}) / \left(\text{Viable} \frac{\text{cells}}{\text{ml}}\right)$$

The flasks are transferred to a 5±1% $CO_2$, 37±2.5° C. incubator for ~24 hr.

Replacing Growth Medium with Starvation Medium (Serum-Free)

DMEM LG starvation medium is warmed in a 37±1° C. water bath for 30±5 minutes. Cell culture flasks are removed from the incubator and the medium is aspirated from the flasks. One cell culture flask is left in the incubator for cell counting purposes. Each flask that was removed from the incubator is washed with PBS (5 ml for a 75 $cm^2$ flask and 10 ml for a 175 $cm^2$ flask), the PBS is aspirated, and DMEM LG starvation medium is added (7.5 ml to a 75 $cm^2$ flask and 17.5 ml to a 175 $cm^2$ flask). The flasks are transferred to a 5±1% $CO_2$, 37±2.5° C. incubator for ~48 hr.

The cell culture flask that remained in the incubator is taken for cell count analysis in order to assess the number of cells at the initiation of the starvation process. Cell counting is carried out as described above (medium aspiration, wash with PBS, cell harvest by trypsinization, suspension in DMEM LG starvation medium and cell counting).

Conditioned Medium Collection

Cell culture flasks are carefully removed from the incubator. The medium is collected into 50 ml tubes and centrifuged 10 minutes at 400×g, 21±2° C. The supernatant (conditioned medium) is collected into a 500 ml bottle. In order to avoid collecting cells and debris from the pellet, the tip of the pipette is positioned at the side of the tube and not all of the supernatant is collected. After collection of the conditioned medium the bottle is swirled. QC samples (e.g., measurements of total protein) are aliquoted into Eppendorf tubes. The rest of the conditioned medium is aliquoted into 50 ml tubes that are kept frozen at −80±10° C. until use.

5. Mesenchymal Growth Factors (MGF) Purification, Diafiltration, Lyophilization and Packaging Preparation of Solutions Sodium hydroxide (NaOH) 0.05N solution is prepared, filtered through a 0.22 μm filter bottle and kept at room temperature.

MGF formula solutions (2 L) are prepared, containing 2.5-3.5% bulking agent (e.g., mannitol), 0.045-0.055% stabilizing agent (e.g., EDTA), 0.45-0.55% tonicity agent (e.g., NaCl) and water for irrigation. The pH of the MGF formula solutions is measured and adjusted to 7.4±0.2 by titration with NaOH 0.5N. Next, 1 L of the MGF formula solution is filtered through two sets of 1 L, 0.22 μm filter bottles. The MGF formula solutions are kept at 2-8° C. until use.

MGF Purification, Diafiltration and Formulation

Conditioned medium (200-1000 ml) is thawed on ice. The conditioned medium is concentrated to 100 ml (i.e. 2-10 concentration factor) and an MGF protein fraction is purified and subsequently formulated with an MGF formula solution as described above using Cogent μScale TFF System (EMD Millipore).

During the concentration process, the conditioned medium is circulated in the Cogent system from the feeding tank (incubated at 4±2° C.) into a 3 kDa filtration cassette at 1.0±0.2 Bar pressure level, and back to the feeding tank. The filtrate, which carries particles smaller than 3 kDa, flows into a waste tank. The retentate is the MGF protein fraction. Circulation and filtration continue until a 100 ml concentrated MGF protein fraction remains in the feeding tank.

Diafiltration and formulation begin by adding a 100 ml MGF formula solution 4±2° C. into the 100 ml concentrated MGF protein fraction in the feeding tank. The solution is then circulated in the Cogent system at 1.5±0.5 Bar pressure level, to clear out a volume of 100 ml. This process is repeated 10 times to create a $2^{10}$ dilution factor of the conditioned medium, and replace it with the MGF formula solution. The concentration of the protein fraction in the resulting liquid formulation is preferably in the range of 0.015-0.025% (w/v).

An exemplary composition of a liquid formulation comprising the MGF fraction according to some embodiments of the present invention is as follows:

TABLE 1 composition of a liquid formulation of MGF prior to lyophilization

| Material | Range |
|---|---|
| Mannitol | 2.5-3.5% |
| Protein fraction (MGF) | 0.015-0.025% |
| EDTA | 0.045-0.055% |
| NaCl | 0.45-0.55% |

Samples of the formulated MGF (F-MGF) are taken for QC analysis (e.g., measurements of total protein and optionally activity assays) and the rest of the F-MGF is stored at 2-8° C. until lyophilization. F-MGF concentration in mg/ml is determined based on the total protein analysis.

Lyophilization Preparations

Vacuum level is set to 0.02±0.002 mBar, the pre-freezing level is set to −75±7° C. Following operation of the device the temperature and vacuum level are monitored until desired temperature is obtained.

Portion Partition

The F-MGF solution is dispensed into vials (2 ml per vial) and the vials are sealed.

Lyophilization Pre-Freezing

The lyophilizer's vacuum is stopped and the vials containing the F-MGF solution are placed on the lyophilizer's shelf. The vials are pre-frozen for 12±4 hours (or o/n).

F-MGF Lyophilization

Shelf temperature is set to −40±4° C. and it is verified that vacuum is set to 0.02±0.002 mBar. When the desired values are reached the vials are freeze-dried for 72±4 hours.

Following lyophilization samples are taken for QC analysis (microbial test, appearance, pH and protein content) and the rest of the lyophilized F-MGF are stored at 2-8° C.

Example 2

Formulation of the Protein Fraction—Selection of a Bulking Agent

Objective: To test several candidate bulking agents for their properties following lyophilization and their ability to dissolve upon reconstitution, in order to select a bulking agent for formulation with the protein fraction.

Methods

Compositions F1-F17 specified in FIG. 1 were prepared by mixing the ingredients of each composition in purified water. Duplicated vials containing 5 ml of each composition were immediately frozen by placing them into an isopropanol bath, at −80° C. All caps were partially opened to prevent vacuum. Once all compositions froze, the vials were transferred to a pre-frozen lyophilizer, and freeze-dried for 3-4 days. Vials were then removed, scaled, and tested for residual water content by Karl Fisher assay and for reconstitution time in PBS.

Results

Bulking agent characterization was carried out by analysis of three candidate materials: mannitol, histidine and BSA. First, each material was tested on its own (compositions F1-F7). Material loss during lyophilization was evaluated by weighing the compositions following lyophilization and comparing the weight to the initial weight of each material. In addition, post lyophilization texture was documented for each composition. Finally, the reconstitution time in PBS was documented, and reconstitution time below 90 seconds was determined as successful reconstitution. The results are summarized in FIG. 2.

The results have shown that there is substantially no material loss during preparation of the lyophilized compositions. There is even an indication of higher material weight following lyophilization than the initial weight of each material in most of the compositions. This might be due to residual water remaining in the lyophilized composition, but water content of the lyophilized compositions was not measured in this experiment.

Next, lower concentrations of each material on its own and also different combinations between the three materials were tested (compositions F8-F14). In addition, compositions containing EDTA (as a stabilizing, chelating agent) and sodium chloride (as an isotonic agent) were tested (compositions F15-F17).

All compositions were tested for residual water content following lyophilization and for post lyophilization reconstitution time (in PBS). Residual water content below 5% and reconstitution time below 20 seconds were determined as successful. The results are summarized in FIG. 3. FIGS. 4A-B provide a graphic representation of the results. The compositions that were successful in both residual water content following lyophilization and reconstitution time were F8, F9 and F15 (highlighted in the figures). Since one of the duplicates of F10 collapsed during lyophilization, no water content was measured for F10.

Conclusions

Compositions should preferably contain no more than 5% w/v of each bulking agent, as it affects the time to dissolve the bulking agent(s) prior to lyophilization, and the reconstitution time of the lyophilized composition.

Histidine was found to be less suitable as a bulking agent under the conditions that were tested. While 5% was rather successful, 3% of histidine, as a single bulking agent or combined with another bulking agent, was unable to reconstitute successfully. The most successful composition containing histidine was 1% histidine combined with 1% BSA, that reached ~30 seconds reconstitution time.

The fastest reconstitution was achieved mainly by compositions which contained mannitol, particularly 3% mannitol. The only mannitol-containing composition which showed slow reconstitution was F10, which also contained histidine.

Residual water content of all compositions provided a good indication for a successful lyophilization process. Nevertheless, only compositions which presented <5% residual water were determined as successful.

BSA-containing compositions F11, F12 and F16 showed the highest water content following lyophilization. These compositions contained either BSA alone or its combination with histidine or EDTA and NaCl. The most successful composition containing BSA in terms of residual water content was F9, which also contained mannitol. Therefore, under the conditions that were tested, BSA may be useful as a bulking agent when combined with mannitol.

Taken together, mannitol-based compositions resulted with the best values for both residual water content following lyophilization and reconstitution time. The only exception was a mannitol-based composition in which mannitol was mixed with histidine, which probably did not achieve complete lyophilization and also showed a long reconstitution time. The other two materials that were tested, BSA and histidine, showed inferior results in terms of water content following lyophilization and/or reconstitution time under the conditions that were tested, and should be re-calibrated if essential to protein stability.

Example 3

Formulation of the Protein Fraction—Additional Excipients

Several aqueous formulations of the protein fraction are provided in FIG. 5. The formulations may be prepared as follows:

Hollow fiber filtration system is washed with DW and subsequently with DMEM F12 w/o FBS. Conditioned medium obtained as described above is first filtered and concentrated ×10 and then washed twice with 3% (w/v) mannitol to obtain a purified protein fraction formulated in 3% (w/v) mannitol. Protein concentration is analyzed at the filtrate and retentate solutions at each of the filtration steps.

Stock solutions are prepared according to Table 2. Mannitol 3% (w/v) in purified water is prepared, and subsequently all other formula materials are dissolved in the mannitol 3% solution.

TABLE 2

| Stock solutions | |
| --- | --- |
| Stock solution | Concentration (w/v) |
| Mannitol | 3% |
| BSA | 0.02% |
| Ascorbic acid | 1% |
| EDTA | 0.5% |
| NaCl | 5% |
| Citric acid | 1% |
| Sodium dihydrogen phosphate monohydrate (NaH$_2$PO$_4$•H$_2$O) | 1% |
| tri-Sodium citrate | 1% |
| Polysorbate 80 | 1% |

Compositions F19-F28 are prepared as specified in FIG. 5. The numbers in the table indicate the volume that is taken from the respective stock solution.

Next, the purified protein fraction formulated in 3% (w/v) mannitol is added to each of compositions F19-F28 to obtain a protein concentration of $2 \times 10^{-3}$% (w/v) in each composition.

Example 4

Activity Assays of ADSC Conditioned Medium (CM) and Formulated MGF (F-MGF)

The following experiments tested the effect of the ADSC conditioned medium (CM) following its collection and a formulated MGF (abbreviated "F-MGF") on the proliferation of Primary Epidermal Keratinocytes; Normal, Human, Adult (NHPEK) (ATCC® PCS-200-011™) cells. The formulation F19 described in Example 3 was used for the assay.

First, NHPEK cells passage number 2 or 3 were diluted with a dermal cell complete medium (DMEM-F12+Dermal Cell Basal Medium, 1:1 (Biological Industries, Israel)) to obtain 50 k and 100 k cells/ml stock solutions. Each stock solution was divided in triplicates to 100 µl per well in a 96-well plate. Remaining wells in the plate were filled with PBS to maintain a wet environment and avoid sample evaporation. The plate was incubated overnight at 37° C., 5% $CO_2$.

On the next day, the medium was aspirated and the wells were washed with 200 µl PBS. After PBS aspiration, 50 µl/well TrypLE™ was added and the plate was incubated for 10 min at 37° C., 5% $CO_2$. Next, the plate was given a few knocks on the side and wells were inspected under a microscope to ensure complete detachment of the cells. The wells were then added with 150 µl of the complete dermal medium and cells were counted using an automated cell counter.

KGF 10 ng/ml was prepared from a stock solution (2 µg/ml, 0.1% BSA in PBS, kept in −80° C.). KGF was diluted with Dermal Cell Badal Medium and DMEM-F12 medium (50% and 50% respectively).

CM (based on DMEM-F12) was diluted with Dermal Cell Basal and DMEM-F12 media (50% and 50% respectively) to obtain 10% CM.

The NHPEK-containing wells were treated as specified in Table 3 and the plates were incubated o/n at 37° C., 5% $CO_2$.

TABLE 3

NHPEK treatments

|  | NHPEK -containing wells | | |
| --- | --- | --- | --- |
|  | Untreated | KGF treatment | CM treatment |
| KGF 10 ng/ml (µl) | 0 | 20 | 0 |
| 10% CM (µl) | 0 | 0 | 400 |
| Dermal complete media (µl) | 2000 | 2000 | 2000 |
| DMEM-F12 w/o FBS (µl) | 2000 | 2000 | 1600 |

Following the o/n incubation the wells were aspirated and washed with 200 µl PBS. After PBS aspiration, 50 µl/well TrypLE™ was added and the plate was incubated for 10 min at 37° C., 5% $CO_2$. The plate was given a few knocks on the side and wells were inspected under a microscope to ensure complete cell detachment. The wells were then added with 150 µl of the complete dermal medium and cells were counted using an automated counter. Relative cell proliferation (%), population delta and doubling time for each treatment group and for the untreated cells were calculated based on the cell counts before and after treatment.

Figure 6B:
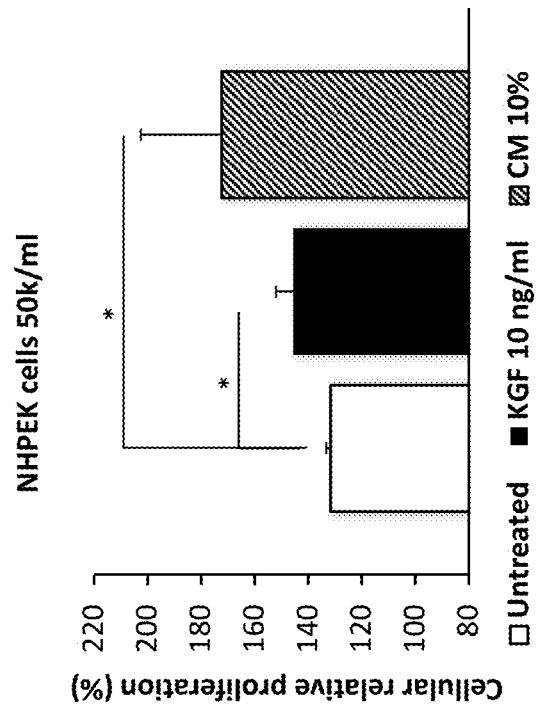
FIG. 6. Effect of conditioned medium ("CM") on the proliferation of Primary Epidermal Keratinocytes; Normal, Human, Adult (NHPEK) cells. (A,B) Cellular relative proliferation, NHPEK cells 100 k/ml or 50 k/ml, respectively; (C,D) Population delta, NHPEK cells 100 k/ml or 50 k/ml, respectively; (E,F) Doubling time, NHPEK cells 100 k/ml or 50 k/ml, respectively; (G, H) Viability (MPI), NHPEK cells 100 k/ml or 50 k/ml, respectively.
Figure 6A:
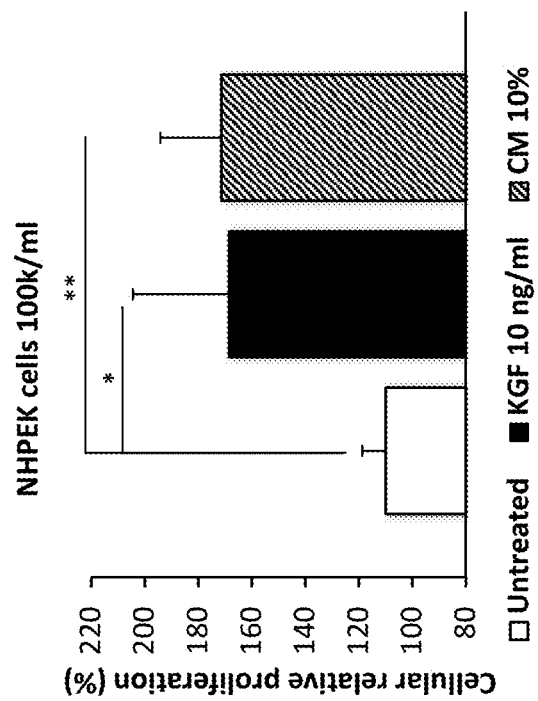

The results are summarized in FIG. 6A-H. The conditioned medium ("10% CM") significantly induced NHPEK proliferation compared to the untreated group, and presented values similar to those of the KGF-treated control group (FIG. 6A-B). The effect of the conditioned medium was similar on both concentrations of NHPEK cells (100 K or 50 K/ml).

Figures 6C, 6D:
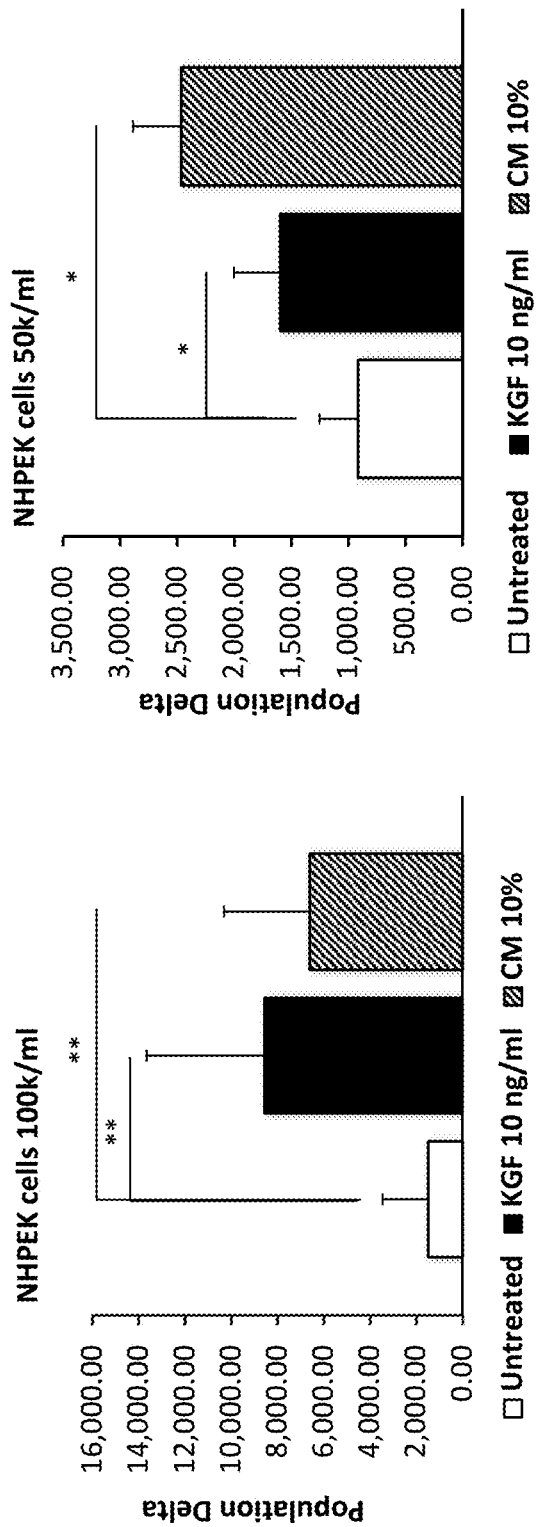

Comparison between population delta values showed poor NHPEK division in the untreated group, while KGF and CM treatments caused an increase in the total population (FIG. 6C-D). While KGF induced proliferation similarly to CM at 100 K/ml, CM presented higher population delta compared to KGF at the low NHPEK concentration (50 K/ml).

Figures 6E, 6F:
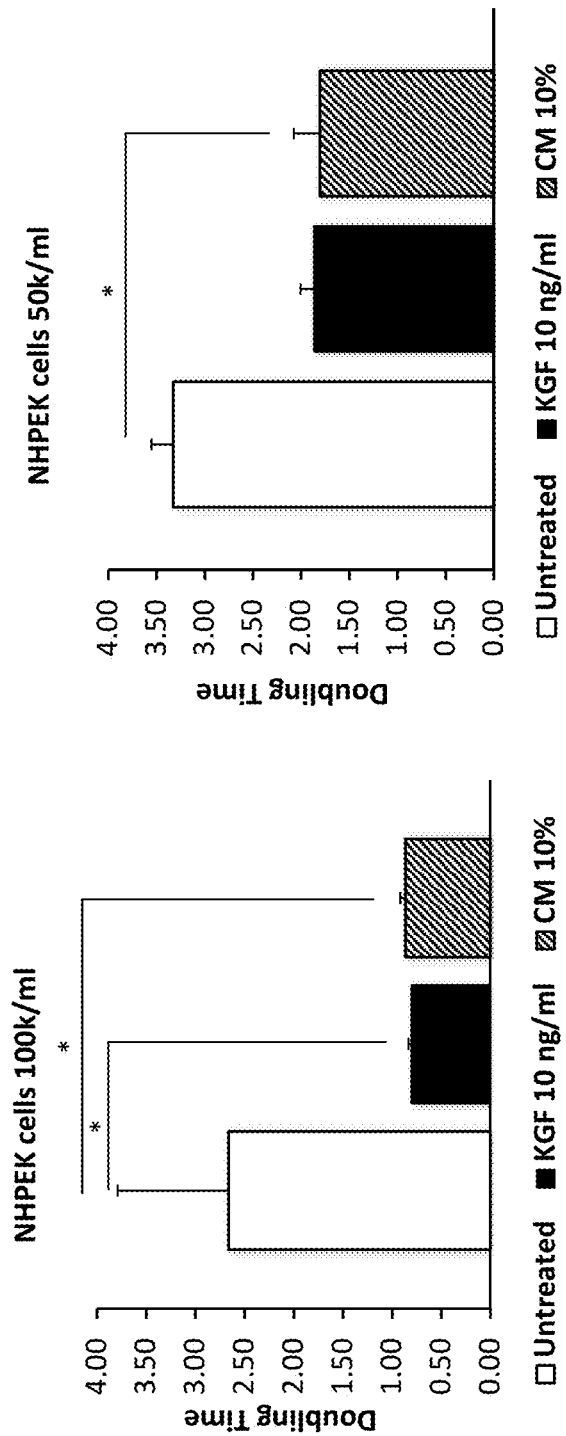

CM induced not only NHPEK proliferation, but also significantly lowered their doubling time (FIG. 6E-F). The untreated group at 100 K/ml in one of the assays did not proliferate and even began to die, and therefore their doubling time value is not presented.

Figure 6H:
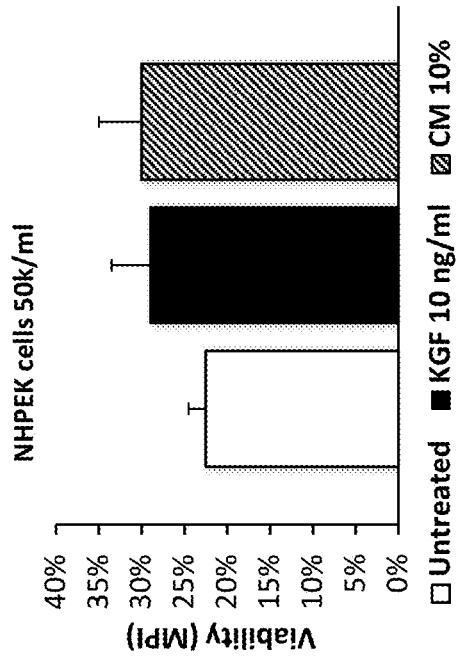
Figure 6G:
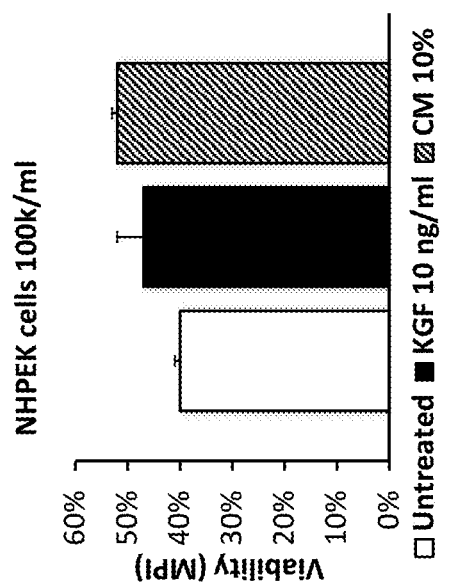
Figure 7A:
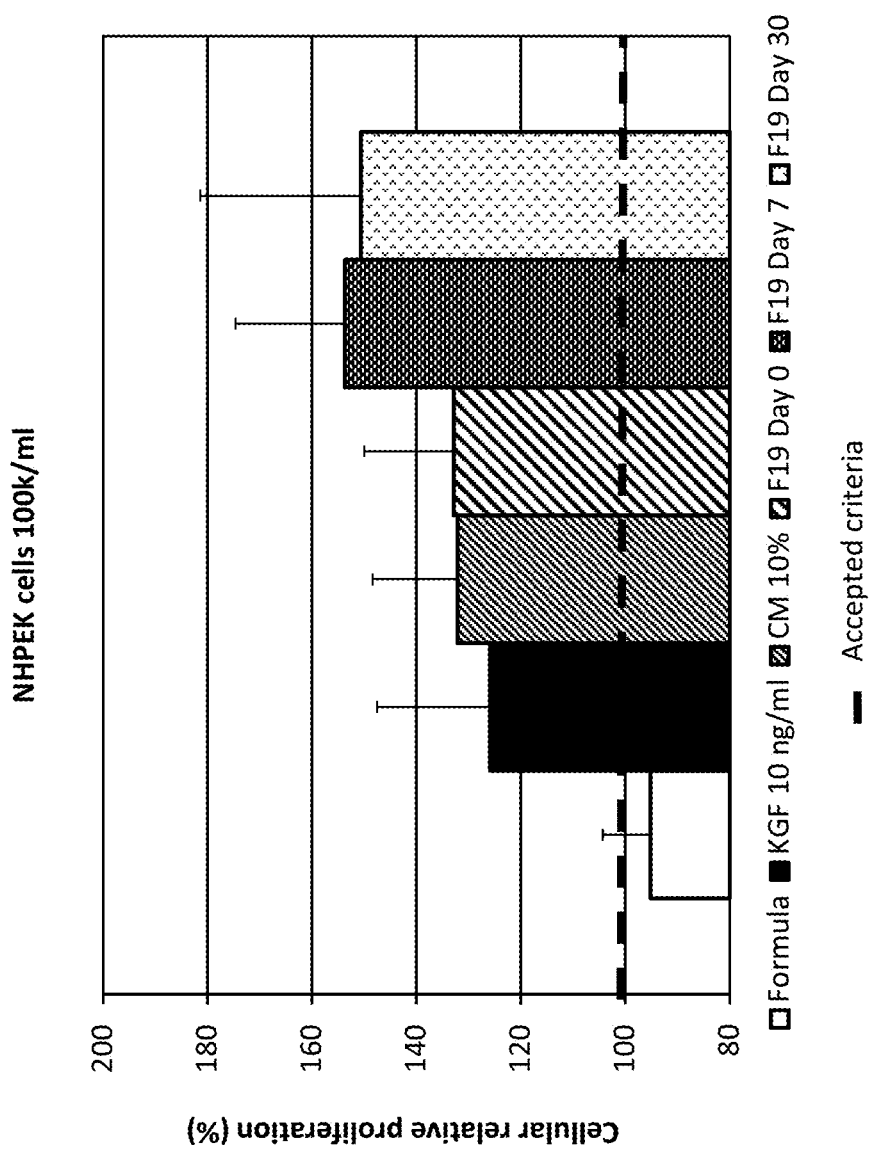
FIG. 7. Effect of conditioned medium ("CM") and formulated protein fraction ("F19") on NHPEK cell proliferation. (A) Cellular relative proliferation; (B) Population delta; (C) Doubling time; (D) Viability (MPI).
Figure 7B:
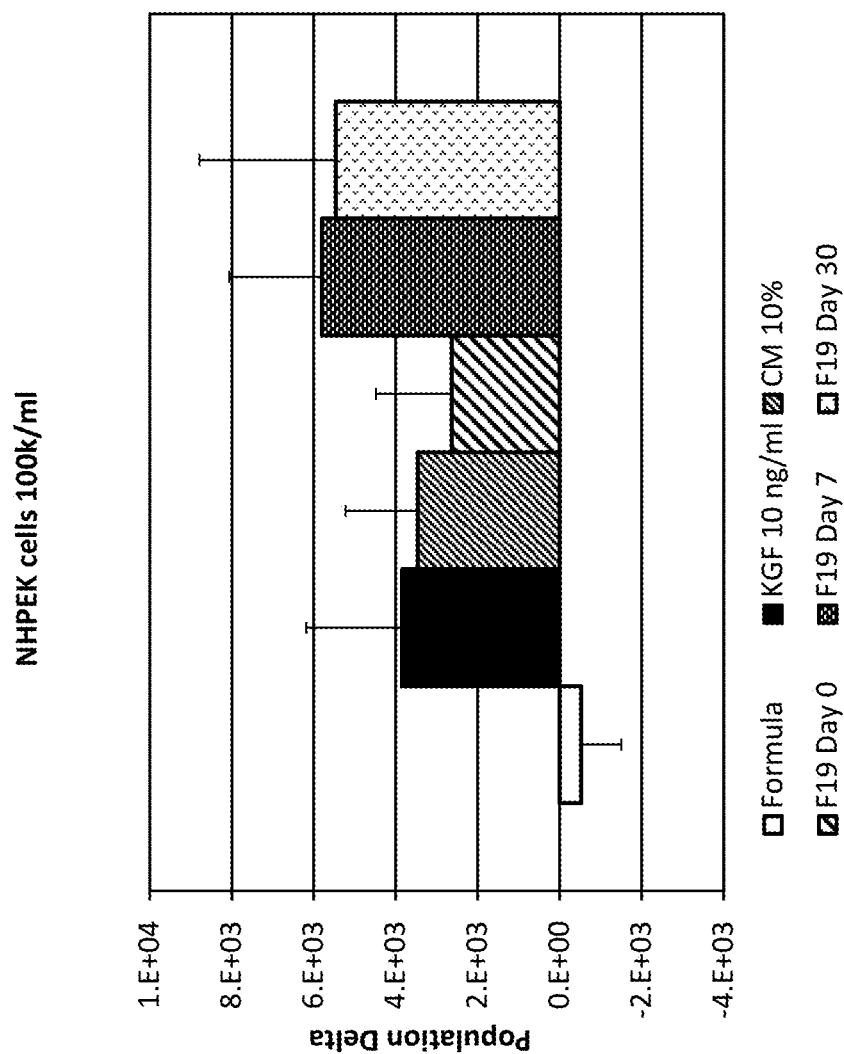
Figure 7C:
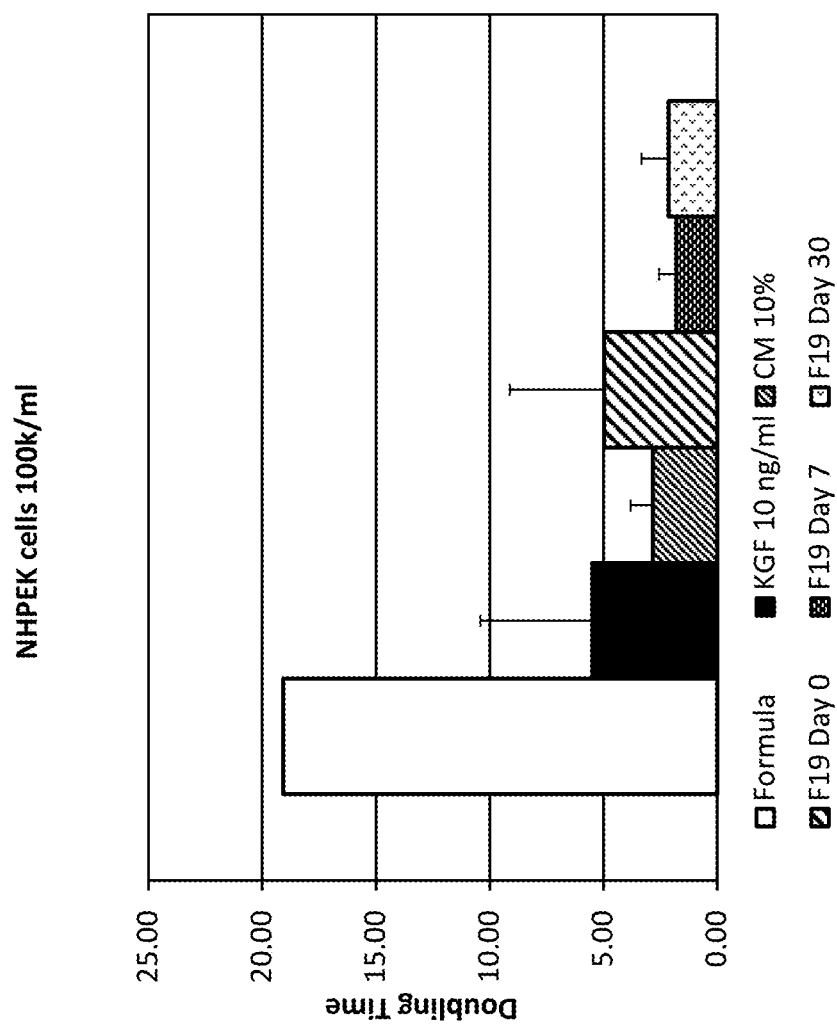
Figure 7D:
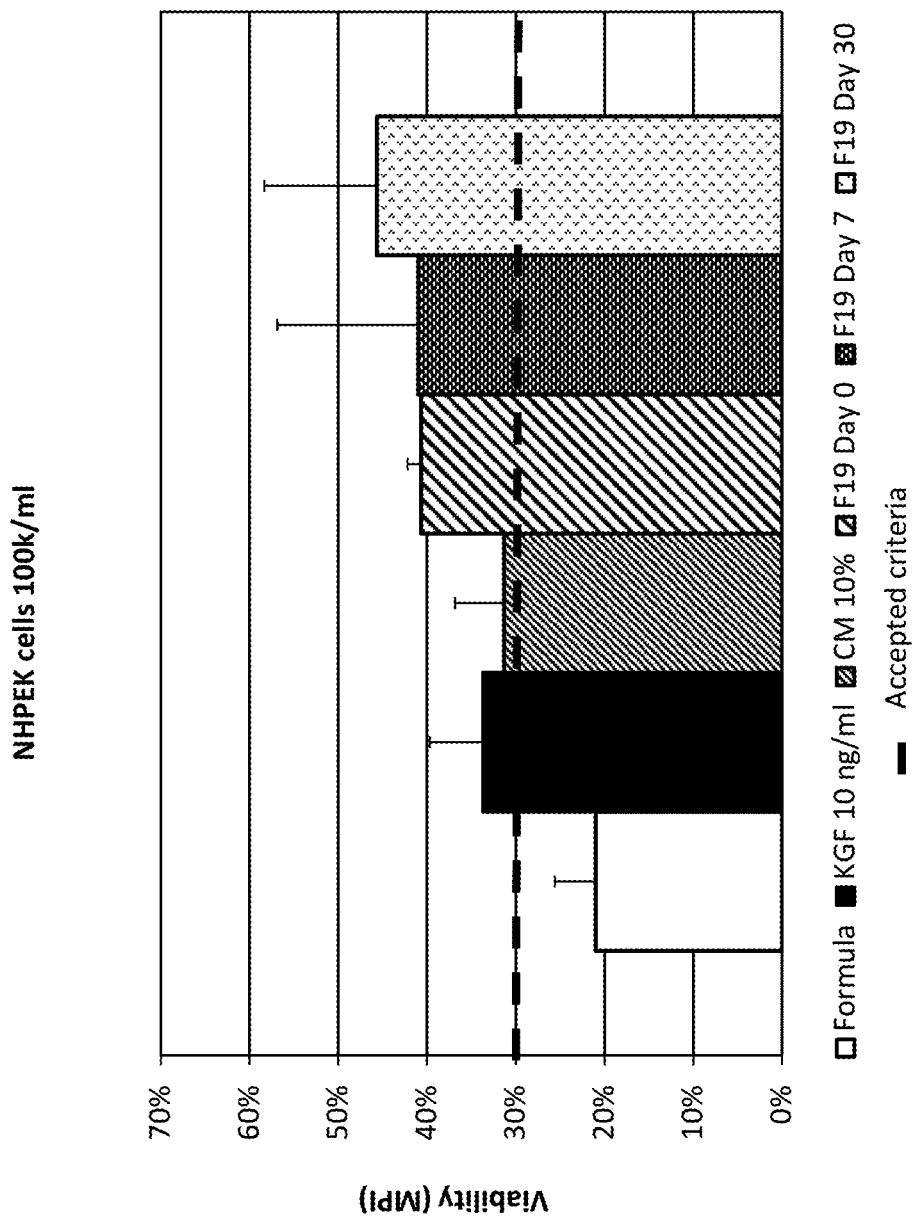

Lastly, the cellular Moxi Population Index (MPI), a cell health assessment index, presented rather better viability under KGF and CM treatments, although the results were not statistically significant (FIG. 6G-H).

A further experiment compared the effect of CM on NHPEK cell proliferation to that of formulated-MGF (F-MGF). The F-MGF that was used for the assay was F19 described in Example 3. The assay was carried out as described above, where data for F19 was measured on Day 0 ("F19 Day 0") and subsequently after 7 days and 30 days at room temperature ("F19 Day 7" and "F19 Day 30", respectively). Treatment with KGF 10 ng/ml served as a positive control. Treatment with the components of F19 without the MGF ("formula") served as a negative control. The results are summarized in FIG. 7A-D.

The results have shown that:
1. F-MGF potency is stable for at least 30 days as detected by NHPEK proliferation assay.
2. F-MGF increases cell viability of NHPEK cells and decreases their doubling time.
3. The combination of proteins in F-MGF is more efficient (higher proliferation rate) than the stand alone KGF proliferation factor Example 5

Growth Medium Clearance by Filtration

The following experiment demonstrated the clearance of cell culture medium components in a process simulating the processing of the conditioned medium during the production of the MGF protein fraction. In particular, the experiment demonstrated clearance of selected metals as the process proceeds from an unprocessed cell culture medium (the commercial cell culture medium DMEM-F12), through several steps of filtration and dilution (washing).

Methods

Hollow fiber filtration system (MicroKros®) was set and connected via peristaltic pump. Flow rate was set to 4.00. Filtrate rate was calibrated to ~0.5 ml/min. The system was placed into a 4° C. refrigerator and washed with DDW. Next, 400 ml of the commercial growth medium DMEM F12 were filtered to obtain 40 ml retentate. A duplicate of 5 ml of the original growth medium was kept for analysis as a positive control. A duplicate of 5 ml mannitol 3% served as a negative control.

Following filtration, a duplicate of 5 ml of the retentate was collected and sent for analysis. 270 ml of mannitol 3% were added to the remaining 30 ml retentate to obtain 300 ml of diluted retentate, referred to herein as "DMEM F12 wash 1".

DMEM F12 wash 1 was filtered using the hollow fiber filtration system to obtain 30 ml retentate. A duplicate of 5 ml of the DMEM F12 wash 1 retentate was kept for analysis. 180 ml of mannitol 3% were added to the remaining 20 ml retentate to obtain 200 ml diluted retentate, referred to herein as "DMEM F12 wash 2".

DMEM F12 wash 2 was filtered using the hollow fiber filtration system to obtain 20 ml retentate. A duplicate of 5 ml of the DMEM F12 wash 2 retentate was kept for analysis.

The remaining DMEM F12 was diluted 1:50 with mannitol 3% (a 10 ml retentate was mixed with 490 ml of a 3% mannitol solution to create a 500 ml diluted solution) to simulate a basic formulation of the protein fraction, and a duplicate of 5 ml was sent for analysis (referred to herein as "Formula").

All samples were sent for ICP mass spectrometry analysis to track the presence of calcium, potassium and magnesium.

Results

Figure 8:
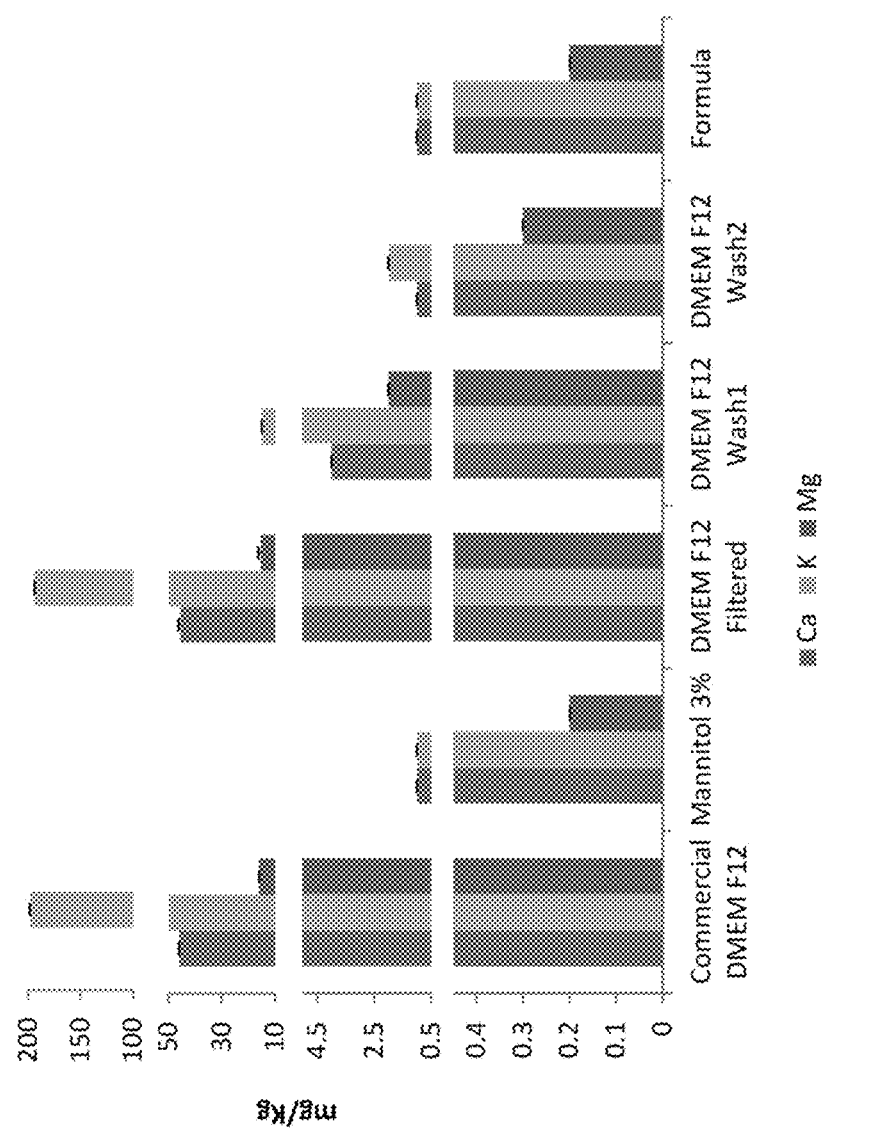
FIG. 8. Growth medium clearance by filtration.

The results are summarized in Table 4 and FIG. 8.

TABLE 4

Metal presence in samples
Presented values are in mg/kg. Boldfaced values are below detection.

| Metal | | Commercial DMEM F12 | Mannitol 3% | DMEM F12 filtered | DMEM F12 Wash1 | DMEM F12 Wash2 | Formula |
|---|---|---|---|---|---|---|---|
| Ca | 1 | 46 | <1 | 45 | 4 | <1 | <1 |
|  | 2 | 46 | <1 | 46 | 4 | <1 | <1 |
|  | Av | 46 | <1 | 45.5 | 4 | <1 | <1 |
|  | STD | 0 | 0 | 0.70 | 0 | 0 | 0 |
| K | 1 | 197 | <1 | 194 | 15 | 2 | <1 |
|  | 2 | 198 | <1 | 194 | 15 | 2 | <1 |
|  | Av | 197.5 | <1 | 194 | 15 | 2 | <1 |
|  | STD | 0.70 | 0 | 0 | 0 | 0 | 0 |
| Mg | 1 | 16 | <0.2 | 16 | 2 | 0.3 | <0.2 |
|  | 2 | 16 | <0.2 | 15 | 2 | 0.3 | <0.2 |
|  | Av | 16 | <0.2 | 15.5 | 2 | 0.3 | <0.2 |
|  | STD | 0 | 0 | 0.70 | 0 | 0 | 0 |

All three selected metals were undetected in the Formula samples, which represent the last processing stage during product manufacturing.

Potassium has the highest initial values in commercial DMEM F12, in comparison to other metallic components. As evident from the table and figure, even K is cleared below detectable levels during the processing of the cell culture medium.

Example 6

Immunophenotype of MSCs for Cosmetic Products

MACS buffer containing PBS, EDTA and FBS is prepared or obtained commercially.

Cell staining is carried out as follows:

A sample containing $5 \times 10^5$ cells is centrifuged for 5 min at 300×g, 4±2° C. The supernatant is discarded and the pellet resuspended with 0.5 ml of cold MACS buffer. Aliquots of 100 ul ($1 \times 10^5$ cells) are dispensed to four labeled Eppendorf tubes. Antibodies are added to each tube according to Table 5.

TABLE 5 antibody staining

| Tube number | Antibody name* | Antibody volume (µl) |
|---|---|---|
| 1 | IgG$_1$-PE | 2.5 |
| 2 | CD73-PE | 2.5 |
| 3 | CD90-PE | 2.5 |
| 4 | CD45-PE | 2.5 |

*Full names: Phycoerythrin (PE) Mouse IgG1 Isotype Control, PE Mouse anti-Human CD73, PE Mouse anti-Human CD90, PE Mouse anti-Human CD45

Each tube is briefly vortexed and the tubes are wrapped with aluminum foils to protect from light. The tubes are incubated at 2-8° C. for 30 minutes or 15 minutes at RT.

After incubation, 1 ml of cold MACS buffer is added to each tube and the tubes are centrifuged for 5 min at 300×g, 4±2° C. The supernatant is discarded and the pellet resuspended in 400 µl of cold MACS buffer.

The cell suspension is transferred from each Eppendorf tube to a corresponding 12×75 mm test tube and the test tubes are analyzed by flow cytometry.

Table 6 summarizes the values for MSC cells for use according to the present invention.

TABLE 6

Data analysis of MSCs

| Antibody Name | Value |
|---|---|
| IgG$_1$-PE | NA |
| CD73-PE | ≥95% |
| CD90-PE | ≥95% |
| CD45-PE | ≤2% |

Example 7

Formulation of a Reconstitution Solution According to the Present Invention

Different formulations of the reconstitution composition were tested in order to obtain a composition with desirable viscosity, texture, pH and stability at temperatures up to 40° C.

Table 7 shows a formulation of a reconstitution composition according to some embodiments of the present invention.

TABLE 7

Reconstitution composition

| Material | Range |
|---|---|
| Imidazolidinyl urea | 0.3-0.4% |
| Carbopol ® 941 | 0.045-0.055% |
| Sodium hydroxide | 0.09-0.11% |
| Isopropyl myristate (IPM) | 1.8-2.2% |
| DC 245 | 1.8-2.2% |
| Montanov ™ 68 | 1.8-2.2% |
| PEG 400 | 4.5-5.5% |
| DC 5225 | 1.8-2.2% |
| Distilled Water | 85-88% |

Table 8 shows a formulation of a reconstitution composition according to additional embodiments of the present invention.

TABLE 8

| Reconstitution composition | |
|---|---|
| Material | Range |
| Imidazolidinyl urea | 0.18-0.22% |
| Emulium ® Delta | (1.5-2.5%) |
| DC 246 | (3.5-4.5%) |
| Distilled water | (92-95%) |

Table 9 shows viscosity parameters of reconstitution compositions according to embodiments of the present invention, as measured using a Brookfield viscometer at room temperature.

TABLE 9

| viscosity parameters | |
|---|---|
| Tested RPM | Range (cP) |
| 12 | 2000-2500 |
| 18 | 1400-2000 |
| 60 | 700-1000 |
| 100 | 500-700 |

The pH of the reconstitution compositions is measured and adjusted to 7.2-7.6 with 0.5N NaOH or 1N HCl and stored at room temperature until use/packaging.

For use/packaging, the reconstitution composition is aliquoted into vials, each containing 3 ml of the composition (net weight of 2.5-3.5 g).

Example 8

Two-Component Cosmetic Product

Tables 10-11 show product specifications for a final product composition according to some embodiments of the present invention.
NLT=no less than

TABLE 10

| Vial A- dry powder | | |
|---|---|---|
| Test | | Specifications |
| Appearance | | White to off-white powder. Cake like appearance, placed at the bottom of the vial. Absence of foreign particles. |
| pH | | 7.0-7.6 |
| Protein content (per vial) | | NLT 20 µg |
| Microbial tests | Enterobacteriaceae | Absent/1 gr |
| | Staphylococcus aureus | Absent/1 gr |
| | Pseudomonas aeruginosa | Absent/1 gr |
| | Total microbial count | <$10^2$ CFU/1 gr |
| | Yeast/Mold | <$10^2$ CFU/1 gr |

TABLE 11

| Vial B- reconstitution composition | |
|---|---|
| Test | Specifications |
| Appearance | White to off-white, viscous liquid lotion. Absence of foreign particles. |
| pH | 7.0-7.6 |
| Total content weight | 2.5-3.5 gr |

TABLE 11-continued

| Vial B- reconstitution composition | | |
|---|---|---|
| Test | | Specifications |
| Microbial tests | Enterobacteriaceae | Absent/1 gr |
| | Staphylococcus aureus | Absent/1 gr |
| | Pseudomonas aeruginosa | Absent/1 gr |
| | Total microbial count | <$10^2$ CFU/1 gr |
| | Yeast/Mold | <$10^2$ CFU/1 gr |

For measuring the pH of the formulated protein fraction in vial A, the content of one vial is dissolved in 500 µl water and the pH is measured. The pH of the reconstitution solution is measured by using the content of vial B as is.

For measuring the protein content of the formulated protein fraction in vial A, the content of one vial is dissolved in 100 µl DMEM. Protein content is measured using the Quick Start™ Bradford ×1 Dye Reagent as follows:

The dye reagent is taken from cold storage (2-8° C.) and allowed to reach room temperature. The dye reagent is inverted a few times before use. Samples are prepared according to Table 12 in triplicates in a 96-well plate and 200 µl of the dye reagent are dispensed to each well. The plate is then incubated at room temperature for 5-15 min

TABLE 12

| Sample preparation for total protein quantification | | | | |
|---|---|---|---|---|
| Sample | Stock BSA samples (µg/ml) | BSA stock solution volume per well (µl) Or Vial A sample volume per well (µl) | Volume of DMEM per well (µl) | Bradford dye reagent volume per well (µl) |
| Standard solutions | 0 | 2.5 | 47.5 | 200 |
| | 125 | 2.5 | 47.5 | 200 |
| | 250 | 2.5 | 47.5 | 200 |
| | 500 | 2.5 | 47.5 | 200 |
| | 750 | 2.5 | 47.5 | 200 |
| | 1000 | 2.5 | 47.5 | 200 |
| | 1500 | 2.5 | 47.5 | 200 |
| | 2000 | 2.5 | 47.5 | 200 |
| Background control | 0 | 0 | 50 | 200 |
| Vial A sample | 0 | 50 | 0 | 200 |

Following incubation an ELISA plate reader is set to 595 nm and the absorbance of each sample is measured and recorded.

A standard curve is created by plotting the 595 nm values (y-axis) versus concentration of the BSA standard in µg/ml (x-axis) and generating a linear regression equation. Accepted criterium for the standard curve is $R^2 \geq 0.95$.

The unknown sample concentration is determined using the standard curve as follows:

$$\text{Sample concentration} = \left[\frac{\text{Sample } OD - b}{a}\right] \times \frac{2.5 \, (\mu l)}{\text{sample volume} \, (\mu l)} \quad \begin{array}{l} a = \text{curve slope} \\ b = \text{curve intercept} \end{array}$$

Example 9

Stability Assay for a Two-Component Cosmetic Product

In the current Example, "accelerated stability assay" indicates an assay that tests stability of the cosmetic product under extreme conditions in order to evaluate the stability of the cosmetic product under standard storage conditions. For cosmetic products intended for storage at room temperature, such as the cosmetic products of the present invention, the accelerated stability assay is carried out at 40±2° C./75±5% RH. Stability is tested at 0, 3 and 6 months.

"Long-term stability assay" indicates a stability assay that is carried out under conditions that simulate the recommended storage conditions for the product. For cosmetic products intended for storage at room temperature, the long-term stability assay is carried out at 25±2° C./60±5% RH. Stability is tested at 0, 3, 6, 9, 12, 18 and 24 months.

The following parameters are evaluated and measured: appearance, pH, total content (total weight) and protein content.

In addition to physiochemical testes that evaluate the product's stability, microbiological (sterility) tests are also carried out: Enterobacteriaceae, *Staphylococcus aureus*, *Pseudomonas aeruginosa*, total microbial count, yeast/mold.

FIGS. 9A-B show the results of a long-term stability assay (FIG. 9A) and an accelerated stability assay (FIG. 9B) of a lyophilized protein composition according to embodiments of the present invention. FIGS. 9C-D shows the results of a long-term stability assay (FIG. 9C) and an accelerated stability assay (FIG. 9D) of a reconstitution composition according to embodiments of the present invention.

As can be seen from the results, both compositions are stable when stored at 25° C./60% RH for at least 6 months. Remarkably, both compositions are also stable under the extreme storage conditions of the accelerated stability assay (40° C./75% RH) for at least 6 months, which is equivalent to 1.5 years of shelf-life under standard storage conditions at room temperature.

Example 10

Safety Evaluation—In Vitro

A. MatTek Corporation EpiDerm™ Skin Model

Objective: To evaluate the test material for irritancy potential utilizing the MatTek Corporation EpiDerm™ in vitro toxicity testing system.

This model system consists of normal, human-derived epidermal keratinocytes (NHEK) which have been cultured to form a multilayered, highly differentiated model of the human epidermis. Keratinocytes are cultured on specially prepared, permeable cell culture inserts. The procedure utilizes a water-soluble, yellow, tetrazolium salt (MTT {3-[4,5-dimethylthiazol-2-yl]-2,5-diphenyl-tetrazolium bromide}), which is reduced by succinate dehydrogenase in the mitochondria of viable cells to a purple, insoluble formazan derivative. Substances which damage this mitochondrial enzyme inhibit the reduction of the tetrazolium salt. The amount of MTT reduced by a culture is therefore proportional to the number of viable cells.

Method:

After the appropriate tissue preparation, 100 microliters of each of: (i) the reconstituted composition according to the present invention; (ii) Triton X-100 (1%) (positive control); and (iii) distilled water (negative control) were added to Millicells containing the EpiDerm™ samples. The plates were then incubated at 37° C., 5% carbon dioxide and >90% humidity.

After the appropriate exposure periods (see Table 13 below), each insert was individually removed from its plate and rinsed twice with PBS to remove any residual material. Excess liquid was shaken off and each EpiDerm™ sample was placed into 300 microliters of MTT solution. The EpiDerm™ samples were then returned to the incubator.

After a 3-hours MTT exposure, each insert was removed and gently rinsed with PBS to remove any residual MTT solution. Excess PBS was shaken from each of the inserts, which were then blotted on the bottom using paper towels. The inserts were then each placed into one (1) well of a 24 well extraction plate. Each insert was then immersed in two (2) milliliters of extraction solution overnight. After the exposure, the liquid within each insert was decanted back into the well from which it was taken. The remaining extractant solution was then agitated and a 200-microliter aliquot of each extract was removed for evaluation. A BioTek 800TS Microplate Reader was used to determine the absorbance of each extract at 570 nm. With the absorbance of the negative control defined as 100%, the percent absorbencies of the test material and the positive control were determined. The percentages listed below directly correlate with the cell metabolism in the EpiDerm™ samples.

Results:

The results are summarized in Table 13:

| Article | | % viability | % inhibition |
|---|---|---|---|
| Reconstituted composition | 20 hrs | 72 | 28 |
| | 4.5 hrs | 88 | 12 |
| | 1 hr | 92 | 8 |
| Triton X-100 | 20 hrs | 4 | 96 |
| | 4.5 hrs | 75 | 25 |
| | 1 hr | 81 | 19 |

For each article, a semi-log scale was used to plot the percent viabilities, on the linear y axis, versus the dosing times, on the log x axis. By interpolation and where possible, the time at which the percent viability would be 50% (ET-50) was estimated.

The reconstituted composition according to the present invention elicited an ET-50 greater than 24 hours. The Triton X-100 reference/positive control article elicited an ET-50 of approximately 7.6 hours. According to MatTek Corporation, as a general guideline, the following groupings can be used in assigning expected in vivo irritancy responses based on the ET-50 results obtained using MatTek's EpiDerm:

ET-50 (hrs): Expected in vivo irritancy:

| <0.5 | Severe, probably corrosive |
|---|---|
| 0.5-4 | Moderate |
| 4-12 | Moderate to Mild |
| 12-24 | Very mild |
| 24 | Non-irritating |

Under the conditions of this test the reconstituted composition according to the present invention have an expected in vivo dermal irritancy potential in the non-irritating range.

B. Hen's Egg Test—Chorioallantoic Membrane (HET-CAM)

Objective: To evaluate the test material for irritancy potential utilizing the HET-CAM test.

The chorioallantoic membrane (CAM) of the chick embryo is a complete tissue with organoid elements from all germ cell layers. The chorionic epithelium is ectodermal and the allantoic epithelium is endodermal. The mesoderm located between these epithelia is a complete connective tissue including arteries, capillaries, veins and lymphatic vessels. The CAM responds to injury with a complete inflammatory reaction, comparable to that induced in the rabbit eye test.

Method:

White Leghorn eggs were obtained and placed in a Kuhl, humidified incubator. The incubator is such that the eggs are automatically rotated once every hour. The temperature was controlled at 37° C. (+2° C.). On day eight (8) the eggs were turned so that the acutely angled end faced down.

On day ten (10) each egg was removed from the incubator and placed in a Plexiglas work enclosure. This enclosure had been preheated and humidified so that its environment approached that of the incubator. A cut was made in the larger end of each egg, where the air sack is located. A Dremel® Moto-Flex Tool (model 232-5) equipped with a Dremel® Cut-Off Wheel (No. 409) was used to make each cut. Forceps were then used to remove the shell down to the shell-membrane junction. The inner egg membrane was then hydrated with a warm, physiological saline solution. The saline was removed after a two (2) to five (5) minute exposure. Utilizing pointed forceps, the inner egg membrane was then carefully removed to reveal the CAM.

The reconstituted cosmetic composition according to the present invention, or a reference article, at a dosage of three-tenths of one milliliter (0.3 ml) of a liquid, were then administered to each of four (4) CAM's. The reference articles that were used are *Nivea* Visage Liposome Eye Contour Gel and Pond's Revitalizing Eye Gel with Vitamin E. Twenty seconds later, the reconstituted cosmetic composition or reference article were rinsed from each CAM with five (5) milliliters of physiological saline. All CAM's were observed immediately prior to test material administration and at 30 seconds, two (2) and five (5) minutes after exposure to the test material. The reactions of the CAM, the blood vessels, including the capillaries, and the albumin were examined and scored for irritant effects as detailed below:

| | Score | | |
|---|---|---|---|
| Effect | at 0.5 min. | at 2 min. | at 5 min. |
| Hyperemia | 5 | 3 | 1 |
| Minimal hemorrhage ("Feathering") | 7 | 5 | 3 |
| Hemorrhage (obvious leakage) | 9 | 7 | 5 |
| Coagulation and/or thrombosis | 11 | 9 | 7 |

The numerical, time dependent scores were totaled for each CAM. Each reaction type can be recorded only once for each CAM, therefore the maximum score per CAM is 32. The mean score was determined for all CAM's similarly tested.

Results:

The results are summarized in Tables 14A-C.

TABLE 14A

Reconstituted composition (50%)

| | Score | | | |
|---|---|---|---|---|
| CAM # | at 0.5 min. | at 2 min. | at 5 min. | Total |
| 1 | 0 | 3 | 0 | 3 |
| 2 | 0 | 3 | 0 | 3 |
| 3 | 0 | 3 | 0 | 3 |
| 4 | 0 | 0 | 1 | 1 |
| | Average: | | | 2.50 |

TABLE 14B

Reference article Nivea Visage Liposome Eye Contour Gel (50%)

| | Score | | | |
|---|---|---|---|---|
| CAM # | at 0.5 min. | at 2 min. | at 5 min. | Total |
| 1 | 0 | 3 | 0 | 3 |
| 2 | 5 | 0 | 0 | 5 |
| 3 | 0 | 0 | 1 | 1 |
| 4 | 0 | 3 | 0 | 3 |
| | Average: | | | 3.00 |

TABLE 14C

Reference article Pond's Revitalizing Eye Gel with Vitamin E (50%)

| | Score | | | |
|---|---|---|---|---|
| CAM # | at 0.5 min. | at 2 min. | at 5 min. | Total |
| 1 | 0 | 0 | 1 | 1 |
| 2 | 0 | 3 | 0 | 3 |
| 3 | 0 | 3 | 0 | 3 |
| 4 | 0 | 0 | 1 | 1 |
| | Average: | | | 2.00 |

Each article was then classified as indicated in the following:

| Mean score | Irritation potential |
|---|---|
| 0.0-4.9 | Practically none |
| 5.0-9.9 | Slight |
| 10.0-14.9 | Moderate |
| 15.0-32.0 | Severe |

Previous studies have shown that the CAM of the hen's egg is more sensitive to liquid irritants than is the rabbit eye. Therefore, 50% dilutions of the test material and reference articles were used to approximate their irritation potential at 100%.

The reference products have been categorized previously as being practically non-irritating, eliciting scores approaching 0, at 24 hours, when dosed at 100% and tested using the Draize ocular irritation methodologies (Draize Scale: 0-110).

Under the conditions of this test, the results indicate that the reconstituted cosmetic composition of the present invention, at 100%, would have practically no ocular irritation potential in vivo.

Example 11

Safety Evaluation—Clinical—Repeated Insult Patch Test

Objective: To determine by repetitive epidermal contact the potential of a test material to induce primary or cumulative irritation and/or allergic contact sensitization.

Participants: Qualified subjects (n=108), male and female, ranging in age from 19 to 79 years. The participants had no visible skin disease which might be confused with skin reaction from the test material. The participants were prohibited of using topical or systemic steroids and/or antihistamines for at least seven days prior to study initiation.

Methodology:

Each test day the test material was prepared as follows:

A vial containing the lyophilized protein composition and a vial containing the reconstitution composition were opened. A pipette was used to draw the reconstitution composition from its vial and transfer it to the protein-containing vial. The compositions were mixed by drawing and releasing the reconstitution composition until all protein powder was dissolved and a reconstituted protein composition was obtained. The reconstituted composition was drawn using a pipette (approximately 0.2 ml) and applied to a 1"×1" absorbent pad portion of a clear adhesive dressing. The adhesive dressing was then applied to the upper back between the scapulae to form a semi-occlusive patch. The application to the skin was carried out within 12 hours from the mixing.

Induction Phase:

Patches were applied three (3) times per week to a total of nine (9) applications. The site was marked to ensure the continuity of patch application. Following supervised removal and scoring of the first induction patch, participants were instructed to remove all subsequent induction patches at home, 24 hours after application. Evaluation of the treatment area was made just prior to re-application.

With the exception of the first supervised induction patch reading, if a treatment area exhibited a moderate (level 2) reaction during the induction phase, application was moved to an adjacent area. Applications would be discontinued for the remainder of the test phase if a moderate (level 2) reaction is observed on the new treatment area. Applications would also be discontinued if marked (level 3) or severe (level 4) reactivity is noted. Rest periods consisted of one or two days following each patch removal.

Challenge Phase:

Approximately two (2) weeks after the final induction patch application, a challenge patch was applied to a virgin treatment site adjacent to the original induction patch site, following the same procedure described for induction. The patch was removed and the treatment area scored at the clinic on Day 1 and Day 3 post-application.

Evaluation criteria (erythema and additional dermal sequelae):

| | |
|---|---|
| 0 = no visible skin reaction | E = edema |
| 0.5 = barely perceptible | D = dryness |
| 1 = mild | S = staining |
| 2 = moderate | P = papules |
| 3 = marked | V = vesicles |
| 4 = severe | B = bullae |
| | U = ulceration |
| | Sp = spreading |

Erythema was scored numerically according to this key. If present, additional dermal sequelae were indicated by the appropriate letter code and a numerical value for severity.

Results:

Observations remained negative throughout the test interval. The test material indicated no potential for dermal irritation or allergic contact sensitization.

Example 12

Efficacy Evaluation

Trial Objectives

To evaluate the efficacy of the cosmetic product to reduce the appearance of wrinkles and uneven skin tone, and to increase firmness and hydration in the skin, over the course of a 12-week use period, following a once weekly use regimen.

To determine the consumer perception of an antiaging product, after 12 weeks of once weekly use, utilizing a questionnaire (see below).

Selection and Withdrawal of Subjects

Number of Subjects 35 female subjects completed the study. Subjects who meet all of the inclusion criteria and none of the exclusion criteria qualify.

Inclusion Criteria

1. Subjects must be female aged 45 to 65 years, inclusive;
2. Subjects must have Fitzpatrick skin phototype I, II, III, or IV:

Skin type Sunburn and tanning history

| Skin type | Sunburn and tanning history |
|---|---|
| I | Always burn easily; never tans |
| II | Always burns easily; tans minimally |
| III | Burns moderately; tans gradually |
| IV | Burns minimally; always tans |

3. Subjects must have wrinkles and uneven skin tone on their face;
4. Subjects must agree to use the supplied Conditioning Phase cleanser for 7 days prior to Day 0 and during the Test Phase;
5. Subjects must arrive at each Testing Facility visit with a pre-washed face (at home), without moisturizer or makeup;
6. Subjects must agree to avoid daily direct ultraviolet radiation exposure on their face or body, whether natural (sun) or artificial (tanning bed) for the trial duration;

7. Subjects must agree to have measurements taken of their face at each Testing Facility visit during the Test Phase;
8. Subjects must read, sign, and date an Informed Consent Form that includes a HIPAA statement;
9. Subjects must read, sign, and date a Photographic Release Form; and
10. Subjects must be considered dependable and capable of following directions.

Exclusion Criteria

1. Subjects who are in ill health, as determined by the PI;
2. Subjects who are taking medication, other than birth control, such as any systemic or topical corticosteroids, immunosuppressants, anti-inflammatories, antihistamines, antibiotics, or other medication that, in the opinion of Investigator may influence the purpose, integrity, or outcome of the trial;
3. Subjects having any visible disease which might be confused with a reaction to the test material;
4. Subjects who are smokers;
5. Subjects who have facial tattoos, scars, or piercings that may interfere with photographs or measurements;
6. Subjects who have used prescription or OTC retinoids or anti-aging treatments on their face within 3 months;
7. Subjects who have had facial treatments (e.g., facial peel, deep cleaning, microdermabrasion, etc.) within 1 week of trial initiation;
8. Subjects who are pregnant, planning to become pregnant, or lactating during the course of the trial;
9. Subjects who have a history of adverse reactions or allergies to cosmetics, OTC drugs, or other personal care products; or
10. Subjects who introduce the use of any new cosmetic, toiletry, or personal care product during the course of the trial.

Withdrawal of Subjects

The subject is free to withdraw their consent to participate in the trial at any time and for any reason, in accordance with the principles of the World Medical Association Declaration of Helsinki (as amended) and of the Belmont Report. The PI also has the right to withdraw a subject from the trial for safety, lack of efficacy, or administrative reasons.

Possible reasons why a subject may be withdrawn from the trial include the following:

1. Experiences a serious or intolerable AE;
2. Develops, during the course of the trial, symptoms or conditions listed in the exclusion criteria, including pregnancy;
3. Takes medications that are contraindicated, as described in the exclusion criteria;
4. Incurs a protocol violation such as failure to comply with the specified treatment regimen or failure to comply with the visit schedule; or
5. Requests an early discontinuation due to:
    A clinical reaction for which the PI did not consider removal from the trial to be necessary;
    Other (non-specific) subject-initiated reason.

Disposition of Withdrawn Subjects

The date the subject is withdrawn from the trial and the reason for discontinuation is recorded on the Case Report Form (CRF). Attempts are made to conduct all evaluations scheduled for the final trial visit as soon as possible after the subject is withdrawn from the trial. When a subject fails to return for scheduled trial visits, the PI makes a reasonable effort to contact the subject and determine why the subject failed to return. This information will be recorded on the CRFs. When a subject is withdrawn from the trial (regardless of the reason), the PI encourages the subject to complete all evaluations which may be necessary to assure that the subject is free of untoward effects, and to seek appropriate follow-up for any continuing problem.

Methodology

Each potential subject provides informed consent before participating in the trial.

Design

This is a single center, monadic, randomized, baseline controlled clinical trial design of 13 weeks duration.

Descriptions of the trial timepoints are shown below:

| Description | Conditioning Phase (Day −7) | Test Phase (Week 0) | Test Phase (Week 6) | Test Phase (Week 12) |
|---|---|---|---|---|
| Expert grader evaluation | — | X | — | — |
| Distribution of conditioning cleanser and daily diaries | X | — | — | — |
| Distribution of test material, daily diaries, and instructions for use | — | X | — | — |
| VISIA-CR ® | — | X | X | X |
| PRIMOS 3D | — | X | X | X |
| Cutometer ® | — | X | X | X |
| MoistureMeterSC ® | — | X | X | X |
| Return conditioning daily diaries | — | X | — | — |
| Return of any unused test material and daily diaries | — | — | — | X |
| Questionnaire | — | — | — | X |

Instrumentation

Environmentally-controlled room. The environmentally-controlled room is maintained at a temperature of 70±5° F. and at a relative humidity of 40±5% using the Johnson Control Metasys® System with a DX-100 controller. Readings of temperature and humidity will be electronically recorded every minute.

Each subject is equilibrated in an environmentally-controlled room for at least 30 minutes prior to all measurements and photographs. All measurements are taken under these conditions.

VISIA-CR® Digital Imaging (Canfield Scientific, Inc., Parsippany, NJ). The VISIA-CR® takes a series of standardized, reproducible digital facial images, inside of a controlled lighting environment. Subject positioning is critical and must be repeated at each time point. Items such as stool height and careful placement of the subject's chin and forehead into the imaging device is maintained. Also, the subject's hair is off their face, jewelry removed, and a black drape used to standardize clothing.

Subjects' front, left, and right views are captured with their eyes gently closed using the following lighting parameters:

Standard 1—General purpose white light
Standard 2—Flat lighting
Cross-polarized—Filters out surface reflections for superior visualization of sub-surface detail
Custom—Visualization of wrinkles Using the VISIA-CR®, a trained bioinstrumentation technician captures standardized digital images of the face at baseline (pre-application), Week 6, and Week 12 visit. These images are used to evaluate the evenness of skin tone at each evaluation interval.

PRIMOS 3D (GFMesstechnik GmbH, Tetlow, Germany). Images of the outer canthus of the right or left eye (randomized) are taken with the Primos Optical 3D measuring device. This instrument uses a micro mirror system to project a parallel stripe pattern onto the skin surface and is projected onto the CCD chip of a high-resolution camera to generate the 3D image. Subjects are positioned such that the outer canthus is perpendicular to the camera, with one edge of the image lined up with the periorbital fossa. Their exact head position is fixed in a restraint device and the position recorded for use in subsequent image captures. Internal software includes a focusing system to ensure that the image captured is within the 3 mm depth of field of the camera. Using the PRIMOS 3D, a trained bioinstrumentation technician captures digital images of the face at baseline (pre-application), Week 6, and Week 12 visit.

Cutometer® MPA580 Probe aperture: 2 mm (Courage+Khazaka, Köln, Germany). One Cutometer measurement is taken of either the right or left upper cheek (randomized). The measuring principle is based on suction and elongation. A negative pressure 450 mbar is used. The probe is placed on the test site, using a consistent application pressure. The skin area to be measured is drawn into the aperture of a probe with a constant negative pressure. This suction time is the first part of the measuring cycle and is called "on-time", and is 3 seconds in duration. Afterward, the negative pressure is switched off (0 mbar) and the skin regains its original shape. This is known as the relaxation time or "off-time" and is also 3 seconds in duration. Each 3 second "on-time" and "off-time" cycle is repeated 3 times. The probe remains on the skin until the end of the measurement cycle. The first part of the suction phase curve is considered the elastic component. The second part of the curve characterizes the viscoelasticity of the skin (plastic component). Measurements are recorded as stretch and rebound. Using the Cutometer®, a trained bioinstrumentation technician captures measurements at baseline (pre-application), Week 6, and Week 12 visit.

MoistureMeterSC® (Delfin Technologies Ltd., Kuopio, Finland) The MoistureMeterSC® measures, in arbitrary units, the dielectric constant occurring between the epidermal layer and the changing thickness of the stratum corneum's dry layer. Increasing the dielectric constant leads to decreased impedance and increased conductance and capacitance. The higher the value, the more hydrated the stratum corneum (upper most layer of skin). Five MoistureMeterSC® measurements are captured and averaged at the test site, at each evaluation interval. All MoistureMeterSC® measurements are captured at the test sites while subjects are in a seated position in the environmentally-controlled room. MoistureMeterSC® measurements are captured at baseline (Week 0), Week 6, and Week 12.

Conditioning Phase (Day (−7))

Potential subjects report to the Testing Facility with a pre-washed face (at home), without moisturizer or makeup, and complete an ICF and a Photographic Release Form. Those who complete an ICF become subjects. Subjects do not wear false eyelashes. Subjects complete a Medical History Form to determine initial qualification.

For 7 days prior to the Test Phase of the trial, subjects discontinue use of any type of moisturizing product on their face. Subjects wash their face two times each day with a non-moisturizing cleanser, SoftSoap®, provided by the Testing Facility. Subjects are required to use the provided cleanser exclusively, in both the Conditioning Phase and Test Phase of the trial.

A daily diary is provided to each subject to document each cleansing of the face.

Test Phase (Week 0)

Subjects report to the Testing Facility at their scheduled appointment time with a pre-washed face (at home), without moisturizer or makeup.

Subjects' daily diaries are returned, reviewed for compliance and retained by the Testing Facility.

An expert grader evaluates each subject's face for evidence erythema, edema, and dryness, and other anomalies, using the following evaluation key:

Evaluation Key:
   0=None
   0.5=Barely perceptible
   1=Mild
   2=Moderate
   3=Marked
   4=Severe Subjects presenting a score of moderate (2) or greater for erythema and edema are disqualified. Subjects presenting a score of at least mild (1) for dryness qualify for the trial. All evaluation scores are recorded on CRFs.

An expert grader also conducts an evaluation of each subject's face for wrinkles and uneven skin tone, using the previously mentioned evaluation key. Subjects presenting a score of at least mild (1) for each qualify for the trial.

Qualified subjects equilibrate in an environmentally-controlled room for at least 30 minutes, as described above. After equilibration, the following procedures are completed by a bioinstrumentation technician, as described above:
   VISIA-CR® images of each subject's face.
   PRIMOS 3D images of each subject's outer canthus, following the randomization.
   Cutometer® measurements of each subject's upper cheek, following the randomization.
   MoistureMeterSC® measurements.

Subjects are provided with a 12-week supply of the test material and a daily diary to document use. Each subject is instructed how to use the test material, as follows:
   1. Open the lotion containing vial by pulling the plastic disc upward, and discard the aluminum sealing cap.
   2. Remove and discard of the rubber stopper from the lotion containing vial.
   3. Open the proteins containing vial by pulling the plastic disc upward, and discard the aluminum sealing cap.
   4. Remove and discard the rubber stopper from the protein containing vial.
   5. Locate the provided disposable pipette, and insert its opened end into the lotion containing vial.
   6. Press firmly at the tip of the pipette and release to draw lotion into the pipette.
   7. Transfer the pipette into the protein containing vial, and release lotion by pressing the tip of the pipette.
   8. Mix well several times by drawing and releasing the lotion, until all protein powder is dissolved.
   9. Draw protein containing lotion with the pipette, and apply topically on the skin.
   10. Once the protein lotion is mixed, use within 12 hours.
   11. Regimen: once a week For each subject, the first test material use is conducted at the Testing Facility under clinical supervision.

Subjects may continue using their regular facial makeup products. Subjects may not introduce the use of any new cosmetic, toiletry, or personal care product during the course of the trial.

Test Phase (Week 6)

Subjects report to the Testing Facility at their scheduled appointment time with a pre-washed face (at home), without moisturizer or makeup. Subjects report to the Testing Facility with their daily diaries. Daily diaries are reviewed for compliance and returned to each subject.

Subjects equilibrate in an environmentally-controlled room for at least 30 minutes, as described above. After equilibration, the following procedures are completed by a bioinstrumentation technician, as described above:

VISIA-CR® images of each subject's face.
PRIMOS 3D images of each subject's outer canthus, following the randomization.
Cutometer® measurements of each subject's upper cheek, following the randomization.
MoistureMeterSC® measurements.

Test Phase (Week 12)

Subjects report to the Testing Facility at their scheduled appointment time after a 12-week use period, with a pre-washed face (at home), without moisturizer or makeup. Any unused test material and completed daily diaries are returned.

Subjects equilibrate in an environmentally-controlled room for at least 30 minutes, as described above. After equilibration, the following procedures are completed by a bioinstrumentation technician, as described above:

VISIA-CR® images of each subject's face.
PRIMOS 3D images of each subject's outer canthus, following the randomization.
Cutometer® measurements of each subject's upper cheek, following the randomization.
MoistureMeterSC® measurements.

A questionnaire is completed by each subject. Questionnaires and daily diaries are reviewed for completeness prior to subjects' dismissal.

Protocol Compliance

After 83 days of the test phase of the trial, scheduled visits to the Testing Facility within 2 days of the scheduled visit are considered to have complied with the protocol.

Statistical Analysis

Statistical analyses are performed on the data collected from the bioinstrumentation devices (VISIA-CR® Image Analysis, PRIMOS 3D, Cutometer®, and MoistureMeterSC®). Prior to performing the analyses, diagnostic tests on the data are performed to determine whether normality and/or homogeneity of variances of the data are maintained. If the above conditions are maintained, a parametric Student's t-Test or Analysis of Variance is performed. If any of the above conditions are not maintained, a non-parametric equivalent to the above statistical tests is utilized. If statistical significance is observed and further statistical comparisons are required, multiple comparison testing are performed and appropriate adjustments to the p-values are made accordingly.

In addition to the above analyses, statistical analyses are conducted on the questionnaire data. The responses for each applicable rating parameter/question are divided into two categories, "successes" and "failures." Responses indicating the subject liked the test material(s) or agreed with a positive statement about the test material(s) are considered "successes." Responses indicating the subject disliked the test material(s) or disagreed with a positive statement about the test material(s) are considered "failures." For any midpoint responses, (i.e. neither like nor dislike; neither agree nor disagree), half of the midpoint responses are counted as "successes" and half are counted as "failures." If there is an odd number of midpoint responses, the "successes" category will receive the extra midpoint response. The proportions of "successes" and "failures" for each rating parameter/question are determined by dividing the number of "successes" and "failures" by the total number of responses. These proportions are compared, and statistically significant differences are identified using a proportion z-Test for each rating parameter/question.

For all of the above analyses, statistical significance is achieved at the 95% confidence level ($p<0.050$).

Safety

Each subject is carefully monitored for the development of any Adverse Events (AEs). The PI evaluates all AEs for their relationship to, or association with the test material (or other causes) and their intensity.

Questionnaire

The consumer perception of the antiaging product is evaluated using a questionnaire in which each subject rates her level of agreement with the statements below, where "1" indicates "Strongly Agree", "5" indicates "Neutral/No Opinion", and "9" indicates "Strongly Disagree":

1. My overall experience with using the lotion product was positive.
2. The lotion had a pleasant, smoothing texture on the skin.
3. The lotion was easy to apply.
4. The color of the lotion is appealing to me.
5. My skin appeared more even-toned after using the lotion.
6. Using the lotion improved my skin texture.
7. Using the lotion periodically gave my skin a younger look.
8. Using the lotion contributes to wrinkle reduction.
9. When I use the lotion, it stimulates my skin, with fresh revitalized appearance.
10. When I use the lotion, it feels it reduces the appearance of aging.
11. Using the lotion encouraged my skin appearance to be toned.
12. Using the lotion provide my skin a rejuvenate appearance.
13. I would recommend this product to a friend.

Results

Analysis of skin smoothness, firmness and hydration using PRIMOS, Cutometer and MoistureMeterSC® as described above showed a smoother skin and reduction in the depth of wrinkles already after 6 weeks of use ($p<0.01$). The reduction in the depth of wrinkles was also observed after 12 weeks of use ($p<0.02$). In addition, softening of the skin was observed after 6 weeks of use, which continued after 12 weeks of use ($p<0.001$). It is noted that statistically significant decrease in skin roughness (smoother skin) and decrease in wrinkle depth is rarely achieved using PRIMOS, further emphasizing the beneficial effects of the cosmetic products of the present invention.

The questionnaire responses are summarized in FIGS. 10A-B. The responses were pooled into two categories: "successes", for subjects who selected 1 ("strongly agree") to 4 for the test material attribute, and "failures", for subjects who selected 6 to 9 ("strongly disagree") for the test material attribute. Subjects who selected 5 ("neutral") were divided evenly between the two categories. If there was an uneven distribution of undecided responses, the "successes" category received the extra-undecided response.

As can be seen in the figure, the responses showed highly positive perception of consumers with product.

Example 13

Product Characterization—Exosome Content

The content of exosomes was measured in a protein fraction according to the present invention formulated with cosmetic excipients, prepared as described in Example 1. The protein fraction was provided in its lyophilized form as "Vial A" of a cosmetic product of the present invention. The measurement included a FACS analysis of exosomal marker expression and exosome quantification using a nanoparticle tracking analyzer (NanoSight™).

Flow Cytometry Protocol

Flow cytometry analysis of exosomal marker expression was carried out using MACSPlex™ kit (Miltenyi Biotec) according to the manufacturer's instructions. The markers that were analyzed are CD81, CD63 and CD9—positive exosomal markers. The flow cytometer used for the analysis is Beckman Coulter Gallios™.

The analysis is based on binding of exosomes to populations of beads coated with marker-specific antibodies. The kit contains a cocktail of various fluorescently labeled bead populations, each coated with a specific antibody binding a specific exosomal surface marker. Overall, 39 bead populations are included, that can be distinguished by different fluorescence intensities by flow cytometry. The kit further contains APC-conjugated antibodies specific for each marker, for detecting the binding of exosomes to the beads.

Figure 12A:
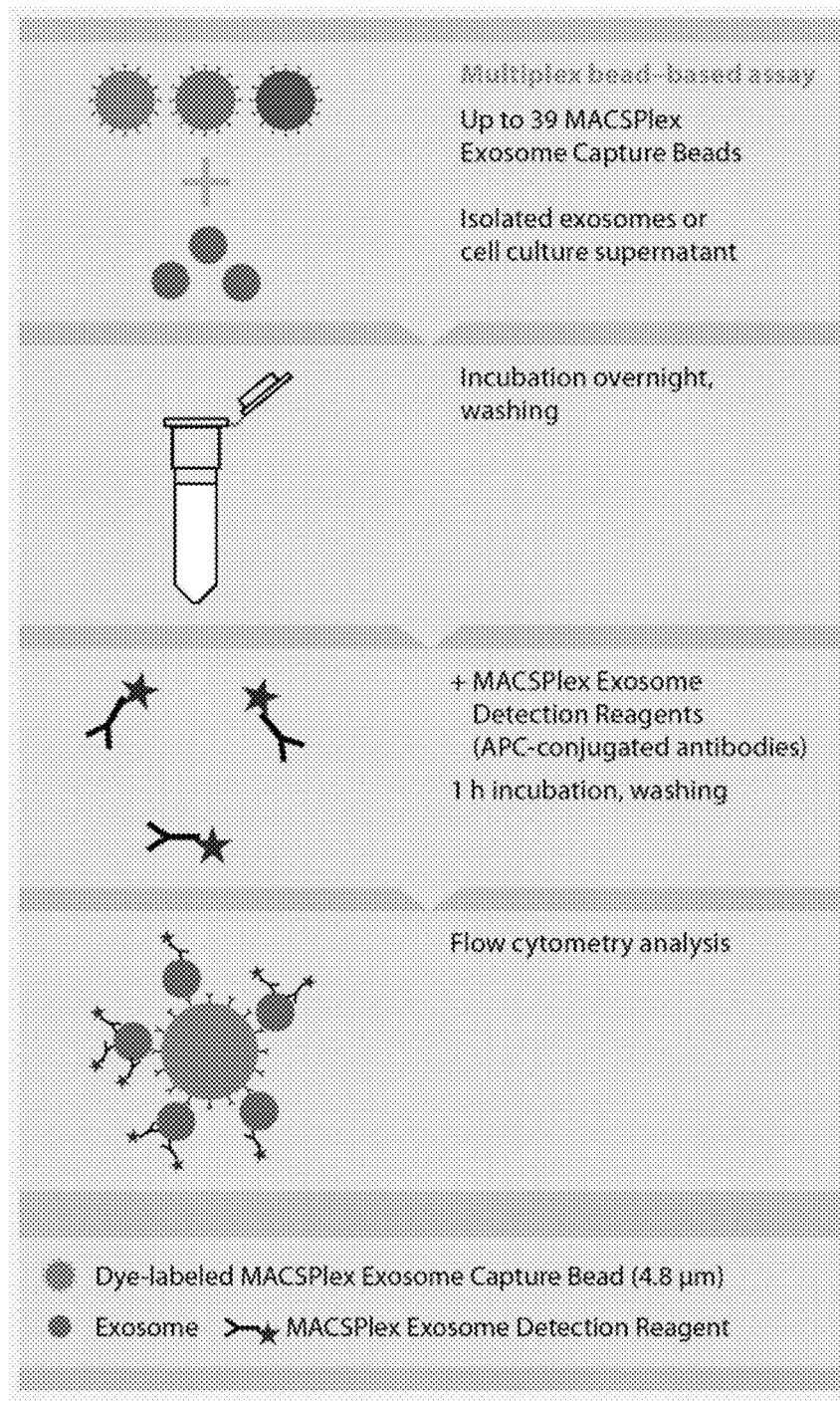
FIG. 12. Product characterization—exosome content. (A) Schematic illustration of a flow cytometry analysis of exosomal marker expression; (B) Exosomal marker expression results; (C) Exosome quantification using NanoSight™.

A schematic illustration of the procedure is shown in FIG. 12A. An analyzed sample is incubated with the antibody-coated beads. Subsequently or in parallel, exosomes bound to the beads are labeled with the APC-conjugated antibodies. In the current example, APC-conjugated antibodies specific to CD81, CD63 and CD9 were used.

The formation of bead-exosome-labeled antibody complexes is evaluated using a flow cytometer based on fluorescence of the beads and the labeled antibody. Positive APC signals in a population of beads coated with a marker of interest indicate the presence of the marker of interest within the exosome population.

The following samples were used for the analysis:
Buffer background (negative control)
Purified ADSC exosomes 60 μg (positive control). ADSC exosomes were purified from the conditioned medium collected after ADSC growth according to a standard differential centrifugation protocol, as follows:
1. Conditioned medium was clarified by three centrifugations followed by filtration and collection of supernatant:
   300 G for 10 minutes at 4° C.;
   2000 G for 10 minutes at 4° C.;
   10,000 G for 30 minutes at 4° C.;
   Vacuum assisted filtration through 0.22 μm filter.
2. Clarified supernatant was subjected to ultracentrifugation at 100,000 G 4° C. for 2 hours.
3. Pellet was collected and loaded on a molecular filtration device Amicon® Ultra 100 kDa.
4. The retained fraction of >100 kDa was washed 5 times with PBS: the volume was completed with PBS up to 0.5 ml and the device centrifuged 15000 G 10 minutes or until volume is reduced to <100 μl.
5. Washed exosomes were stored at −80° C.
Vial A 100 kDa pellet 120 μg
Vial A 100 kDa flow through "Vial A100 kDa pellet 120 μg" and "Vial A 100 kDa flow through" were prepared as follows:
1. The content of Vial A of the cosmetic product (the lyophilized protein composition) was dissolved in PBS and loaded on a molecular filtration device Amicon® Ultra 100 kDa.
2. The flowthrough fraction (<100 kDa) was collected and kept as "Vial A 100 kDa flow through".
3. The retained fraction of >100 kDa was washed 5 times with PBS: the volume was completed with PBS up to 0.5 ml and the device centrifuged 15000 G 10 minutes or until volume is reduced to <100 μl.
4. Washed retained fraction was identified as "Vial A100 kDa pellet 120 μg" and stored at −80° C. until analysis.

Figure 12B:
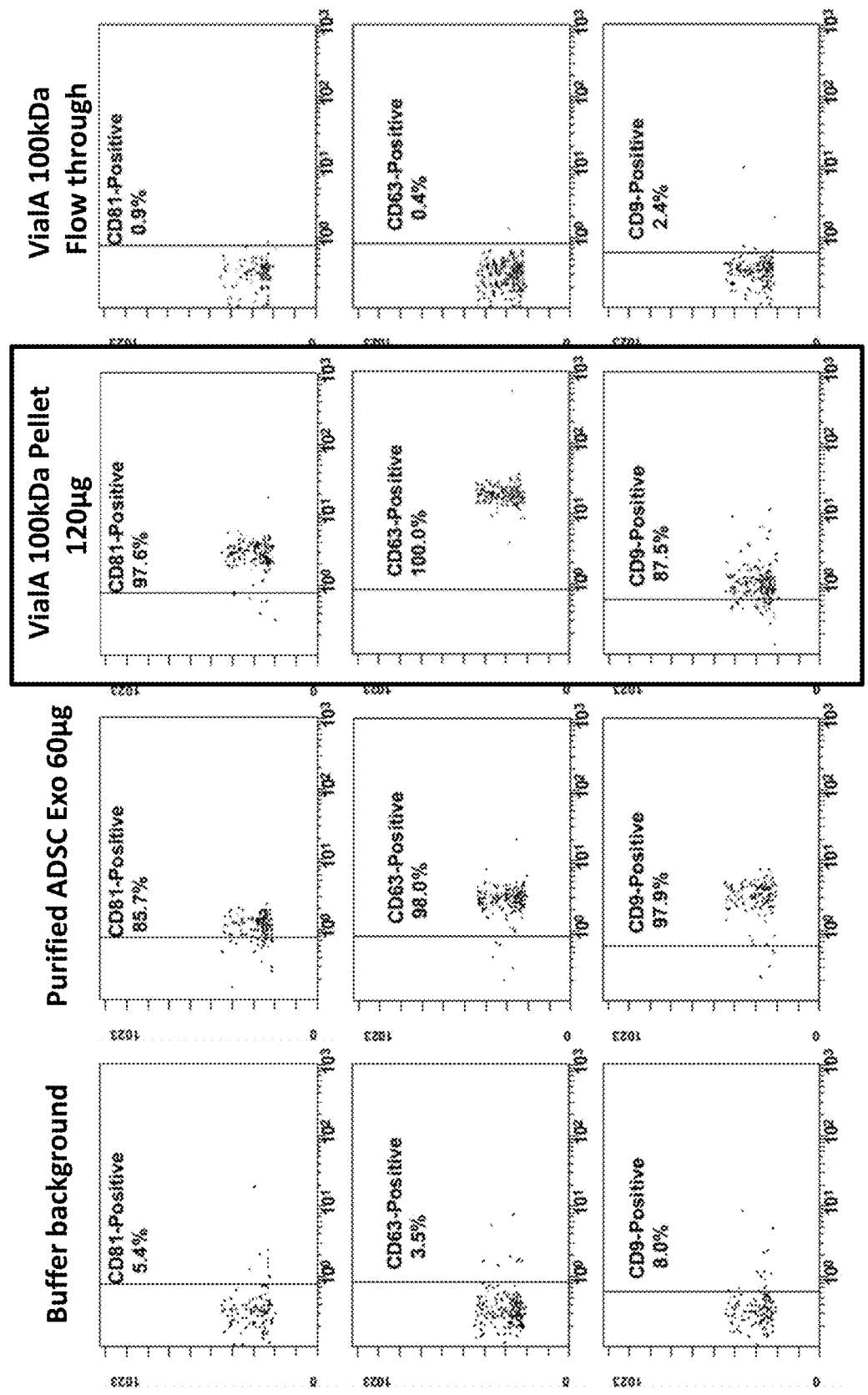

The results are summarized in FIG. 12B, which shows flow cytometry density plots of the APC fluorescent signals detected for each of the three exosomal markers in the control and test samples. The vertical bars mark positivity for the APC signal. Positive expression of CD81, CD63 and CD9 was detected in the protein composition of the present invention, indicating that exosomes are present in the composition.

NanoSight™ Analysis

The number and mean diameter of exosomes in the protein composition of the present invention were measured using the nanoparticle tracking analyzer NanoSight™.

The following samples were used for the analysis:
"Cosmetics"—the content of Vial A dissolved in PBS. The sample loaded onto the NanoSight™ instrument included 10 μl from 27 vials, which equal the volume of ~1.5 vials.
"Purified ADSC exosomes 60 μg"—as described above.

Figure 12C:
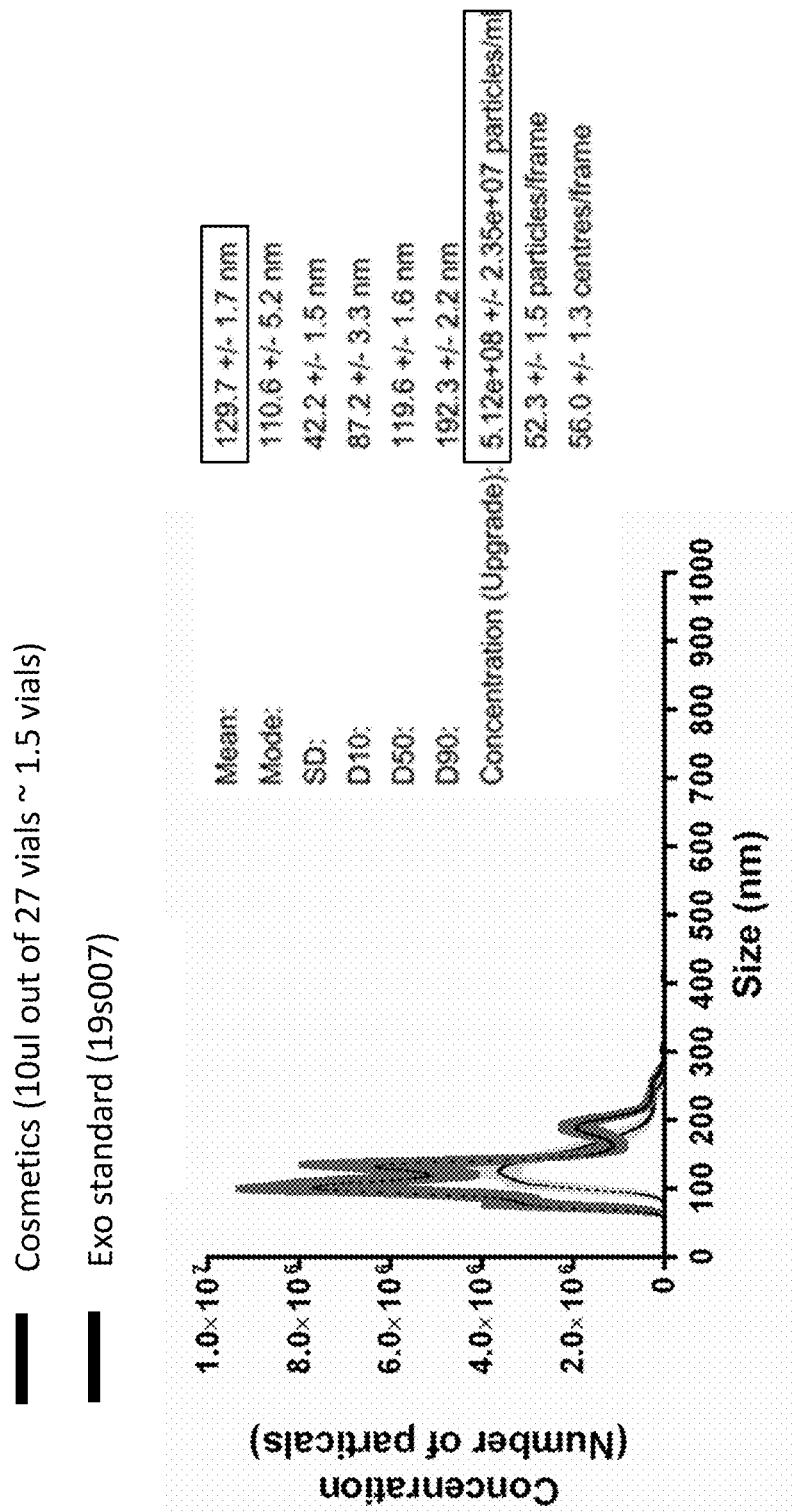

The results summarized in FIG. 12C. The results have shown that the exosomes are present in the composition in an amount of $10^8$ exosomes per vial, which reflects a content of $10^9$ exosomes per 1 mg of total protein. The mean diameter of the exosomes is approximately 130 nm.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

The invention claimed is:

1. A cosmetic composition in a powder form comprising a dried fraction purified from a human adipose-derived stem cell conditioned medium and cosmetically acceptable excipients,
wherein the human adipose-derived stem cells were grown in a serum-containing medium at a temperature of 35-39° C. under a condition of 5±1% $CO_2$ for at least 24 hours and subsequently in a serum-free medium at a temperature of 35-39° C. under a condition of 5±1% $CO_2$ for at least 48 hours prior to collection of the medium,
wherein the fraction comprises proteins and particles that remained after removal of components smaller than 3 kDa and retainment of components equal to or larger than 3 kDa, wherein the cosmetically acceptable excipients comprise: 70%-85% (w/w of the total weight of the composition) of a bulking agent or combination of bulking agents, wherein the bulking agent comprises mannitol; 1.0%-1.5% (w/w of the total weight of the composition) of a stabilizer, wherein the stabilizer is EDTA; and 10%-15% (w/w of the total weight of the composition) of a tonicity agent, wherein the tonicity agent is sodium chloride.

2. The cosmetic composition of claim 1, comprising at least $10^9$ exosomes per mg protein.

3. The cosmetic composition of claim 1, wherein the fraction is substantially devoid of components of the cell culture medium in which the human adipose-derived stem cells were grown.

4. The cosmetic composition of claim 1, wherein the protein content of the composition is at least 0.2 µg/mg powder.

5. The cosmetic composition of claim 1, obtained by a process comprising the following steps: (a) obtaining human adipose-derived stem cells (hADSCs); (b) culturing the hADSCs in a serum-containing medium for at least 24 hours; (c) sub-culturing the hADSCs in a serum-free medium for at least 48 hours to obtain a conditioned medium; (d) separating the hADSCs and cell debris and collecting the conditioned medium; (e) concentrating and filtering the conditioned medium using Tangential Flow Filtration (TFF) to remove components smaller than 3 kDa and obtain the fraction as a retentate; (f) diafiltrating the fraction using an aqueous formulation comprising the cosmetically acceptable excipients to obtain the fraction purified from cell culture medium components and formulated with the aqueous formulation; and (g) drying the obtained fraction.

6. The cosmetic composition of claim 1, wherein the medium is conditioned by human adipose-derived stem cells obtained by a process comprising the following steps: (a) freezing a lipoaspirate; (b) thawing the lipoaspirate and dissociating with a tissue-dissociation enzyme or by mechanical disruption; (c) pelleting a cellular fraction comprising the ADSCs by centrifugation, and optionally washing the pellet with a suspension medium capable of supporting cell viability and subjecting the suspension to at least one additional centrifugation; (d) resuspending the pellet obtained in step (c) in a suspension medium capable of supporting cell viability and selecting ADSCs from the population of cells in the resuspended pellet; (e) optionally conducting at least one filtration prior to the ADSC selection; and (f) optionally culturing the ADSCs for at least 3 passages.

7. The cosmetic product of claim 1, wherein the medium is conditioned by a population of human adipose-derived stem cells characterized by positive expression of CD73, CD90 and CD105 by at least 90% of the cells, and positive expression of CD45 by less than 5% of the cells.

8. A method for improving at least one skin condition associated with aging, the method comprising providing the cosmetic composition of claim 1; reconstituting the composition to obtain a composition suitable for application to the skin; and applying to the skin.

9. A two-component cosmetic product comprising, as separate compositions ready for mixing:
(a) a dried protein composition in a powder form comprising a fraction purified from a human adipose-derived stem cell conditioned medium and cosmetically acceptable excipients according to claim 1; and
(b) an aqueous reconstitution composition comprising water and cosmetically acceptable excipients, for reconstituting the dried protein composition to form a composition suitable for topical application to the skin of a subject,
wherein the two components are maintained separately and mixed prior to use.

10. The cosmetic composition of claim 9, provided as a prefilled syringe, wherein the syringe comprises: a first chamber comprising the aqueous reconstitution composition, a second chamber comprising the dried protein composition, and a plunger, wherein upon movement of the plunger the aqueous reconstitution composition is delivered from the first chamber into the second chamber and mixed with the dried protein composition for reconstitution.

* * * * *